(12) United States Patent
Bolognue

(10) Patent No.: US 11,448,424 B2
(45) Date of Patent: Sep. 20, 2022

(54) TANKLESS WATER HEATER WITH DISPLAY AND ELECTRONIC CONTROL

(71) Applicant: Eccotemp Systems, LLC, Summerville, SC (US)

(72) Inventor: Joseph Bolognue, Summerville, SC (US)

(73) Assignee: Eccotemp Systems, LLC, Summerville, SC (US)

(*) Notice: Subject to any disclaimer, the term of this patent is extended or adjusted under 35 U.S.C. 154(b) by 45 days.

(21) Appl. No.: 16/844,023

(22) Filed: Apr. 9, 2020

(65) Prior Publication Data

US 2021/0318031 A1 Oct. 14, 2021

(51) Int. Cl.
| | | |
|---|---|---|
| F24H 9/20 | (2022.01) | |
| F24H 9/02 | (2006.01) | |
| F24H 1/10 | (2022.01) | |
| F24D 19/10 | (2006.01) | |
| F24H 9/00 | (2022.01) | |
| G08B 21/18 | (2006.01) | |
| G10L 15/22 | (2006.01) | |
| G05D 23/19 | (2006.01) | |
| H04L 12/28 | (2006.01) | |
| F24D 19/00 | (2006.01) | |

(52) U.S. Cl.
CPC ....... *F24H 9/2035* (2013.01); *F24D 19/1063* (2013.01); *F24H 1/107* (2013.01); *F24H 9/02* (2013.01); *F24D 19/0092* (2013.01); *F24H 9/0042* (2013.01); *G05D 23/1951* (2013.01); *G08B 21/18* (2013.01); *G10L 2015/223* (2013.01); *H04L 12/2825* (2013.01)

(58) Field of Classification Search
CPC .......... F24H 9/2035; F24H 9/02; F24H 1/107; F24H 9/0042; F24D 19/1063; F24D 19/0092; G05D 23/1951; G08B 21/18; G10L 2015/223; H04L 12/2825
USPC ............................... 237/8 a; 122/14.2, 448.1
See application file for complete search history.

(56) References Cited

U.S. PATENT DOCUMENTS

| | | | | |
|---|---|---|---|---|
| 4,655,239 | A | * | 4/1987 | Kato ................. F23N 1/087 137/94 |
| 6,170,493 | B1 | | 1/2001 | Sivacoe |
| 6,192,192 | B1 | | 2/2001 | Illy et al. |

(Continued)

FOREIGN PATENT DOCUMENTS

| | | | |
|---|---|---|---|
| CA | 2272955 | | 12/1999 |
| CN | 2639791 Y | * | 9/2004 |

(Continued)

OTHER PUBLICATIONS

"CN_2754013_Y_I—Machine Translation.pdf", machine translation, Clarivate Analytics. (Year: 2022).*

(Continued)

*Primary Examiner* — Steven B McAllister
*Assistant Examiner* — Daniel E. Namay
(74) *Attorney, Agent, or Firm* — Stephens Domnitz Meineke, PLLC; Ira P. Domnitz; Matthew C. Juren

(57) ABSTRACT

An apparatus and method for heating water using a tank or a tankless water heater with improved electronic control. The improved electronic control may include voice and Wi-Fi control of the water heater to allow for remote control of the water heater including through a remote server or cloud server.

6 Claims, 13 Drawing Sheets

(56) References Cited

U.S. PATENT DOCUMENTS

| | | | |
|---|---|---|---|
| 6,286,764 B1* | 9/2001 | Garvey | G05D 27/02 236/12.12 |
| 6,308,009 B1 | 10/2001 | Shellenberger et al. | |
| 6,391,121 B1 | 5/2002 | Sivacoe | |
| 6,606,968 B2* | 8/2003 | Iwama | F24H 9/2035 122/18.1 |
| 6,722,978 B2 | 6/2004 | Tweedy et al. | |
| 6,833,032 B1 | 12/2004 | Douglas et al. | |
| 7,322,532 B2* | 1/2008 | Takada | F24H 9/2035 236/11 |
| 7,672,576 B2 | 3/2010 | Grossbach et al. | |
| 8,165,461 B2 | 4/2012 | Sullivan | |
| 8,677,946 B2 | 3/2014 | Deivasigamani et al. | |
| 8,934,763 B2 | 1/2015 | Laing | |
| 9,063,551 B2 | 6/2015 | Deivasigamani et al. | |
| 9,167,630 B2 | 10/2015 | Seitz et al. | |
| 9,182,159 B2 | 11/2015 | Hatada et al. | |
| 9,234,664 B1 | 1/2016 | Hayner et al. | |
| 9,381,549 B1 | 7/2016 | Kane et al. | |
| 9,410,708 B2 | 8/2016 | Taylor | |
| 9,513,019 B2 | 12/2016 | Acker | |
| 9,535,434 B2 | 1/2017 | Stevens et al. | |
| 9,702,568 B2 | 7/2017 | Miller et al. | |
| 10,619,887 B2* | 4/2020 | Sugatani | F28G 9/00 |
| 11,231,182 B2* | 1/2022 | Trant | F24D 19/0092 |
| 2003/0131804 A1* | 7/2003 | Iwama | F24H 9/2035 122/18.1 |
| 2003/0226794 A1 | 12/2003 | Coke | |
| 2005/0006402 A1 | 1/2005 | Acker | |
| 2005/0121529 A1 | 6/2005 | DeLangis | |
| 2005/0274329 A1* | 12/2005 | Brewster | F24D 1/005 122/36 |
| 2006/0222351 A1* | 10/2006 | Cezayirli | F24H 1/102 392/490 |
| 2008/0033651 A1* | 2/2008 | Inoue | G01W 1/10 702/3 |
| 2009/0139466 A1* | 6/2009 | Takayama | F24D 19/1051 122/14.2 |
| 2010/0122668 A1* | 5/2010 | Ando | F24H 1/186 122/14.3 |
| 2011/0036544 A1 | 2/2011 | Shirai et al. | |
| 2012/0052453 A1* | 3/2012 | Besore | F24H 1/124 431/14 |
| 2012/0079995 A1* | 4/2012 | Jacques | F24H 9/2007 122/19.2 |
| 2012/0118246 A1 | 5/2012 | Oberkorn et al. | |
| 2012/0225395 A1 | 9/2012 | Haggerty | |
| 2013/0042635 A1* | 2/2013 | Nelson | F24H 4/04 62/79 |
| 2014/0297048 A1 | 10/2014 | Buchheit et al. | |
| 2015/0053779 A1* | 2/2015 | Adamek | F24D 19/1084 236/1 C |
| 2015/0148971 A1* | 5/2015 | Acker | G05B 15/02 700/282 |
| 2016/0334139 A1* | 11/2016 | Bronson | F16K 31/128 |
| 2019/0032961 A1 | 1/2019 | Murray et al. | |
| 2019/0162425 A1* | 5/2019 | Maekawa | F24D 19/1051 |
| 2019/0212033 A1* | 7/2019 | Consadori | B60H 1/2203 |
| 2019/0241045 A1* | 8/2019 | Feng | F24H 9/1836 |
| 2019/0243396 A1* | 8/2019 | Sobieski | F24H 9/2007 |
| 2019/0338987 A1* | 11/2019 | Young | F24H 1/205 |
| 2019/0360183 A1* | 11/2019 | Vetterli | E03C 1/044 |
| 2020/0200397 A1* | 6/2020 | Trant | B01J 49/85 |
| 2020/0220378 A1* | 7/2020 | Trant | F24H 1/101 |
| 2021/0000286 A1* | 1/2021 | Devlin | A47J 31/4489 |
| 2021/0095890 A1* | 4/2021 | Nishikawa | F24H 1/107 |

FOREIGN PATENT DOCUMENTS

| | | | | |
|---|---|---|---|---|
| CN | 2725778 Y | * | 9/2005 | |
| CN | 2754013 Y | * | 1/2006 | |
| CN | 106440384 A | * | 2/2017 | |
| CN | 106500344 A | * | 3/2017 | |
| CN | 107842992 A | * | 3/2018 | |
| CN | 108317732 | | 7/2018 | |
| CN | 109631310 A | * | 4/2019 | |
| CN | 110057105 A | * | 7/2019 | |
| CN | 110726253 A | * | 1/2020 | |
| CN | 111271871 A | * | 6/2020 | |
| EP | 2116516 | | 11/2009 | |
| EP | 3892934 A1 | * | 10/2021 | |
| EP | 3892935 A1 | * | 10/2021 | |
| JP | H068700 B2 | * | 2/1994 | F24D 19/1051 |
| JP | 2018109485 A | * | 7/2018 | |
| WO | 96/41994 | | 12/1996 | |
| WO | 00/06956 | | 2/2000 | |
| WO | 2009/060192 | | 5/2009 | |
| WO | 2013/156376 | | 10/2013 | |
| WO | 2016/008001 | | 1/2016 | |
| WO | 2017/143275 | | 8/2017 | |
| WO | WO-2017143275 A1 | * | 8/2017 | F24H 1/009 |

OTHER PUBLICATIONS

"CN_109631310_A—MachineTranslation.pdf", machine translation, Clarivate Analytics. (Year: 2022).*

"JP_2018109485_A_I—Machine Translation.pdf", machine translation, Clarivate Analytics. (Year: 2022).*

* cited by examiner

TANKLESS WATER HEATER WITH DISPLAY AND ELECTRONIC CONTROL

CROSS-REFERENCE TO RELATED APPLICATIONS

Not applicable.

STATEMENT REGARDING FEDERALLY SPONSORED RESEARCH

Not applicable.

BACKGROUND

The present invention generally relates to improved water heating devices and methods of use.

The present invention is distinguished over the following prior art.

U.S. Pat. No. 2,272,955 discloses a digital control of a larger storage tank trying to increase efficiency. '955 disclosed placement of heating elements on the sides of the storage tank. The present invention does not place heating elements on the sides of a storage tank.

U.S. Pat. No. 6,170,493 discloses a method for cleaning the tubing in a water heater. The present invention does not disclose a methodology as found in '493.

U.S. Pat. No. 6,192,192 discloses an instantaneous water heater associated with heating a single external coil with a wire. The present invention does not disclose the invention of '192.

U.S. Pat. No. 6,391,121 discloses a method for cleaning a heater. The present invention discloses a water heater and methods of heating water.

U.S. Pat. No. 6,308,009 discloses digital control of multiple elements, the present invention only controls one heating element and is focused on controlling temperature remotely via smart home voice commands and mobile application. Ours also reports fact based monetary statistics based on use.

U.S. Pat. No. 6,744,978 discloses a heating element. The present invention discloses a water heater.

U.S. Pat. No. 6,833,032 discloses a steam cooker control, not a water heater.

U.S. Pat. No. 7,672,576 discloses a water dispenser with sabbath function. The present invention discloses a water heater.

U.S. Pat. No. 8,165,461 discloses a basic multichambered electric tankless design focusing on heat chambers for tankless water heaters. Ours focuses on single heat exchangers or single heating element controlled remotely via smart home voice commands and mobile application. Ours also reports fact based monetary statistics based on use.

U.S. Pat. No. 8,677,946 discloses a recirculation system. The present invention does not address a recirculation system.

U.S. Pat. No. 8,934,763 discloses a water delivery system with a faucet device. The present invention discloses a water heater.

U.S. Pat. No. 9,167,630 discloses a small point of use tankless water heater control board. The '630 patent discloses point of use single application. It is also focused on the control board itself and not use or functionality. Ours focuses on single heat exchangers or single heating element controlled remotely via smart home voice commands and mobile application. The present invention reports fact based monetary statistics based on use.

U.S. Pat. No. 9,234,664 discloses a control add on for recirculation of water with a tank. The present invention, in several embodiments, utilizes intelligence for control functions (changing temperatures), not systems integration like the present invention.

U.S. Pat. No. 9,381,549 discloses a portable descaling machine for heat transfer systems. The present invention discloses a water heater.

U.S. Pat. No. 9,410,708 discloses an apparatus and method for descaling tankless water heaters. The present invention discloses a water heater.

U.S. Pat. No. 9,513,019 discloses a computer driven water recirculation system. The present invention discloses a water heater.

U.S. Pat. No. 9,535,434 discloses a hot water management system. The present invention discloses a water heater.

U.S. Pat. No. 9,702,568 discloses the operation of a full tank water heater. The present invention discloses a water heater in mini, or tankless form.

Patent Application 2003/0226794 discloses a steam boiler scale inhibitor. The present invention discloses a water heater.

Patent Application 2005/0006402 discloses a method for operating a plumbing system. The present invention discloses a water heater.

Patent Application 2005/0121529 discloses a self-powered electronically controlled mixing valve. The present invention discloses a water heater.

Patent Application 2011/0036544 discloses a heat exchanger. The present invention discloses a water heater.

Patent Application 2012/0118246 discloses a sealed water heater flushing system. The present invention discloses a water heater.

Patent Application 2012/0225395 discloses a method and system for limiting boiler heat input. The present invention discloses a water heater.

Patent Application 2014/0297048 discloses a digital quota system, which involves adding breakers into plumbing network. '048 is about adding external water controllers/sensor to let a person know when their water heater is out of hot water. The present invention does not function in that manner. The '048 application is for an entire home storage tank water heater whereas the present invention is a point of use tankless or mini water heater.

Application WO 1995/0411994 discloses a method and system for limiting water boiler heat input. The present invention discloses a water heater.

Application WO 2009/060192 discloses liquid heating controls for vessels. The present invention discloses a water heater.

Application WO 2000/006956 discloses a lime build up maintenance system.

Patent EP 2116516 discloses a machine with water heating and anti-scaling, such as a washing machine. The present invention discloses a water heater.

SUMMARY

In some embodiments of the present invention, the present invention is an improved water heater device, system and method for use.

In several embodiments of the present invention, the present invention is a smart home water heater and/or a tankless water heater. In several embodiments of the present invention, the present invention is a voice commanded, and/or controlled water heater or tankless water heater. In some embodiments, the present invention is a tankless water heater with Radio Frequency "rf" wireless remote. In some embodiments, the present invention utilizes smart technology to control a water heater, or tankless water heater.

In some embodiments, the present invention utilizes an "In Voice" or voice commanded on/off application. In some embodiments, the present invention utilizes a voice command temperature adjustment. In some embodiments, the present invention is smart home compatible. In some embodiments, the present invention can provide a cleaning/descaling/error notification via mobile SMS text, email, in app/text alerts. In some embodiments, the present invention will send notifications to the customers to let them know when it's time to clean their tankless water heater. In some embodiments, this is based on two variables: time and amount of water that flows through the product. In some instances, for individuals that use a lot of water, the water flow sensor will track the amount of water used and then send notifications. For individuals that don't use the water heater a lot, it will be based on time in service.

In some embodiments, the present invention has an ecce-mode technology setting that allows the water heater to run at half the power usage. In some embodiments, the present invention uses a water heater usage timer. In several embodiments, a user can utilize a smart application to set the length of time the water heater can run or be used based on the timer. By way of example, if a user wants hot water for up to ten minutes per use, a user can set the timer.

In some embodiments, the present invention utilizes "Smart Button" technology. In some embodiments of the present invention, one single button flashes in certain ways to indicate an error or when not connected to a network. For instance, if the water heater is giving an E# error code, the on and off button will flash 3 times, then pause, then flash 3 times, then pause, to indicate there is an E3 error. The button will also turn different colors based on errors. The single button can also turn it off and on and turn different colors based on connection to a network.

In some embodiments, the present invention utilizes programming built into an application to let customers input KWH electricity rates and gas consumption rates they receive from a utility company to give them accurate product energy consumption costs. In some embodiments, the programming and product is the only one to let a user input actual rates to get actual product cost while using it.

In several embodiments, the present invention utilizes a real time dashboard that shows actual input/output water temperature and water flow. In several embodiments, the present invention utilizes a water quality selection programming. In several embodiments, this lets customers choose the type of water they have, to help determine when the product should receive maintenance. In several embodiments, selections such as: City Water (municipal), Well Water, and Location will determine products for maintenance.

In several embodiments, the present invention is a "smart home" water heater. In several embodiments, the present invention is a "smart home" mini storage tank water heater and/or mini water heater. In several embodiments, the present invention is a voice commanded, or controlled water heater or mini water heater. In several embodiments, the present invention utilizes a unique water heater with voice and manual controls. In several embodiments, the present invention is a smart home water heater with smart mobile app. In several embodiments, the present invention is a smart home point of use water heater.

In several embodiments, the present invention is voice commanded on/off. In several embodiments, the present invention can use a manual mode technology—when you use the dial located on the side of the water heater, you can control your water heater's temperature manually. By way of example, once turned on, your water heater is no longer a smart home water heater. This feature can be used in case a network is down and a user needs to adjust the product temperature.

In several embodiments, the present invention uses voice command temperature adjustments. In several embodiments, the present invention is smart home compatible. In several embodiments, the present invention utilizes a Cleaning/Descaling/Error notification. In several embodiments of the present invention, the notification comes through a mobile SMS text, email, and/or in app/text alerts. In several embodiments, the smart application will send notifications to the customers to let them know when it's time to clean their water heater. In several embodiments of the present invention, this is based on two variables. In some embodiments, the time and amount of water that flows through the product are the main variables. By way of example, for some individuals that use a lot of water, the water flow sensor will track the amount of water used and then send notifications. For individuals that don't use the water heater a lot, it will be based on time in service.

In several embodiments, the present invention utilizes a water quality selection program. This lets customers choose the type of water a user may have to help determine when the product should be maintained. Selections such as: city water (municipal), well water, and/or specific locations.

In several embodiments, the present invention utilizes a water heater usage timer. A user can utilize the inventive smart application to set the length of time the water heater can run or be used based on the timer. If a user only wants hot water for up to 10 minutes per use, they can set the timer. In several embodiments, the present invention is a smart button technology. In this regard, one single button flashes in certain ways to indicate an error or when not connected to a network. For instance, if the water heater is giving an E# error code, the on and off button will flash 3 times, then pause, then flash 3 times, then pause, to indicate there is an E3 error. The button will also turn different colors based on errors.

In several embodiments, the present invention is a program built into a proprietary application designed to let customers choose recommended temperature settings: Comfort, Low, High, Commercial. In this embodiment, a customer can select the recommendation, and the water heater temperature automatically adjusts. In several embodiments, the present invention uses programming built into our application to let customers input KWH electricity rates they receive from a utility company to give them accurate product energy consumption costs. In several embodiments, the present invention uses a real time dashboard that shows actual input/output water temperature and water flow.

In several embodiments of the present invention, voice commands can be used for temperature adjustment, scheduling, statistics, notifications, errors, status, timer and modes, monetary statistics, use statistics, on/off, network connectivity, alarms, smart button.

BRIEF DESCRIPTION OF THE DRAWINGS

For a more complete understanding of the present disclosure and the advantages thereof, reference is now made to the following descriptions to be taken in conjunction with the accompanying drawings describing specific embodiments of the disclosure, wherein.

DETAILED DESCRIPTION

Figure 1:
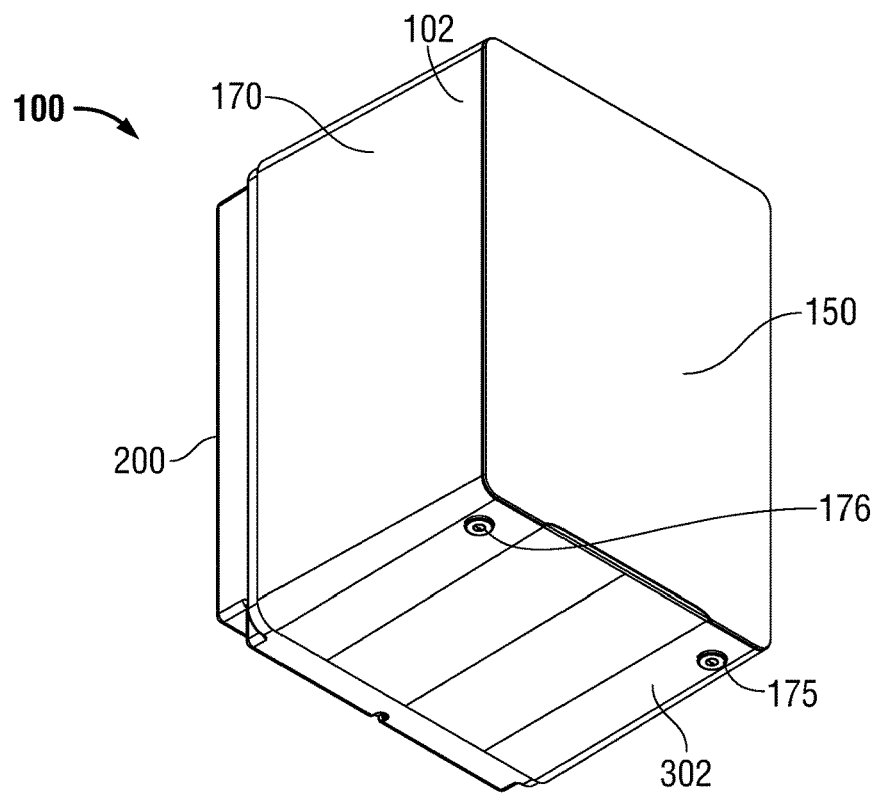
FIG. 1 illustrates one embodiment of the present invention in a partial side view from the top.

One or more illustrative embodiments incorporating the invention disclosed herein are presented below. Applicant has created a revolutionary and improved water heater device and method of use.

In the following description, certain details are set forth such as specific quantities, sizes, etc. to provide a thorough understanding of the present embodiments disclosed herein. However, it will be evident to those of ordinary skill in the art that the present disclosure may be practiced without such specific details. In many cases, details concerning such considerations and the like have been omitted inasmuch as such details are not necessary to obtain a complete understanding of the present disclosure and are within the skills of persons of ordinary skill in the relevant art.

Referring to the drawings in general, it will be understood that the illustrations are for the purpose of describing embodiments of the disclosure and are not intended to be limiting thereto. Drawings are not necessarily to scale, and arrangements of specific units in the drawings can vary.

While most of the terms used herein will be recognizable to those of ordinary skill in the art, it should be understood, however, that when not explicitly defined, terms should be interpreted as adopting a meaning presently accepted by those of ordinary skill in the art. In cases where the construction of a term would render it meaningless, or essentially meaningless, the definition should be taken from Webster's Dictionary 2020, 11$^{th}$ Edition. Definitions and/or interpretations should not be incorporated from other patent applications, patents, or publications, related or not, unless specifically stated in this specification, or if the incorporation is necessary for maintaining validity. As utilized herein, the following terms have the following definitions.

In several embodiments, "Smart home" means a product that can connect to a wireless or wired network and exchange data or information with a remote server or, cloud service. In several embodiments, the remote server or cloud service can then transfer that information to a mobile application or website to display information about the product's status, usage, or other metrics. The application or website can then be accessed by a user to view this information. The user can then edit, change or use this information to control the product. The product can receive information wired or wirelessly from the remote server or cloud service to change settings, modify its operation, or alter how data is collected. This includes wireless voice commands from a user relayed through the remote server or cloud service. As a user speaks into other compatible smart home products, those products can then send commands to our water heater either directly or through a remote server or service. The commands go from other smart home devices to the cloud, then to the user's network to the product to make those changes in real time.

In several embodiments, "Voice Command" is defined as issuing audio instruction, transmitting it to the cloud and then connecting to the product to affect a control.

In several embodiments, "Smart Button" or "Smart Button technology" means that a single button can perform several tasks. In several embodiments, this button can be used to turn a product on/off in which it changes color when doing so. It can also blink in certain patterns that mean different things. In several embodiments, this button uses blink patterns and different colors to indicate different things. For instance, red color could mean "on", blue color could mean "off". One blink in blue every three seconds could indicate a certain error in the product. In several embodiments, two blinks could mean something else, etc. . . . Using blink and color patterns, this smart button relays different information to the user. When the product is connected to a network, the user can see the button information and or changes the button has made. For instance, if a user turns the product off via button, then the mobile application will be updated to show the product is off.

In several embodiments, "manual mode" means a product can be controlled manually, not just digitally via mobile app. The user has an option to override all digital control of the product by simply switching it to manual mode. This includes temperature adjustments manually, not through a network. When in manual mode the product cannot be controlled remotely.

In several embodiments, "smart home device capable" is defined as a water heater's technology allowing it to connect to other smart devices. When a customer has one of these devices, they can add our products to the device to enable that device to control our water heaters via application or through voice control.

In several embodiments, "real time data" is defined as the water heaters being able to transmit data in real time to the cloud, then to a mobile application or website in real time. It can also display statistics and usage in real time. This includes water flow, temperatures, warnings, notifications and controls.

In several embodiments, "service notifications" is a program that monitors servicing needs. This programming is tied to sensors that tell the user how much water has been used and when it is time to descale the product. These notifications are necessary to make sure that the user keeps their water heater running at full efficiency. This efficiency monitoring is based on the amount of water used and location. It calculates the optimal time to clean your water heater based on the water quality of a particular location.

In several embodiments, "advanced statistics" is defined as the water heaters being able to tell a user how much electricity, gas and water they have used and giving them an accurate monetary cost associated with the use of the product. Our mobile application allows customers to enter actual utility costs to calculate this. It then displays this information to the end user. This can be displayed by day, month, year or in real time.

In several embodiments, "mini tank insulation" or "insulation" is defined as a unique polyurethane mold to insulate the steel holding tank. This is used to insulate the storage tank to keep the internal water hot. What makes this unique is the fact that it is not sprayed into our product. It is a separate piece that is specifically designed to fit around our holding tank. It cuts down on messes and allows our mini tanks to actually be serviced unlike other brands. It allows for product control boards ("PCBs") to be replaced, as well as heating elements and other mechanical parts.

In several embodiments, "heating rod", "water rod" or "rod" is defined as a rod used to guide water to the bottom of the storage tank. This is unique because it forces water right to the heating element where water is being heated. This design allows for quicker heating of water and water separation which extends the time of heated water.

In several embodiments, the heating element of one embodiment of the present invention is different by location. Some tanks have a heating element that heats in the middle of the tank. In several embodiments of the present invention, the location of the heating element is unique in design because ours heats from the bottom of the storage tank. The incoming water rod guides the water straight to the heating element at the bottom, allowing for faster, more efficient heating of incoming water.

In several embodiments of the present invention, the tankless water heater or the mini-tank water heater can use either gas or electric heating elements.

While preferred embodiments have been shown, and described, modifications thereof can be made by one skilled in the art without departing from the scope or teaching herein. The embodiments described herein are exemplary only and are not limiting. Many variations and modifications of the system and apparatus are possible and will become apparent to those skilled in the art once the above disclosure is fully appreciated. For example, the relative dimensions of various parts, the materials from which the various parts are made, and other parameters can be varied.

In several embodiments, one embodiment of the present invention works as follows: Water flows into the water heater. Temperature sensors and other sensors take this information and send it to the product control board. The product control board then sends this information through the user's network, to the cloud, then to the mobile app/computer to display it. Sensors detect temperatures, errors, use and power consumption. When the water is being heated, sensors detect electricity usage. They also detect incoming water temperatures. When the mini is connected to a wireless/wired network, this information is sent to the cloud. The cloud then sends this information to a mobile app/computer to display this information. When the user makes any changes via mobile app/computer, this information is then sent back to the product control board to make necessary changes.

FIG. 1 illustrates one embodiment of the present invention in a partial side view from the top. As illustrated, water heater 100 is comprised of a rear housing 200, a casing 170 and a front face 150. As shown, in several embodiments, the rear housing 200, casing 170, and front face 150, are comprised of noncorrosive and industry materials as utilized with a water heater, which can include, but are not limited to, ABS and/or tempered glass. Further shown are foot pads 175, and 176. In several embodiments, front face 150 may be constructed of tempered glass. In several embodiments, the rear housing 200, casing 170, and front face 150, can mechanically engage to form a containment vessel 102 with a hollow interior. In several embodiments, containment vessel 102 is designed to house a water heater tank through inner holding tank 31 (See FIG. 3). As further shown, there is insulator 131 for inner holding tank 31.

Figure 2:
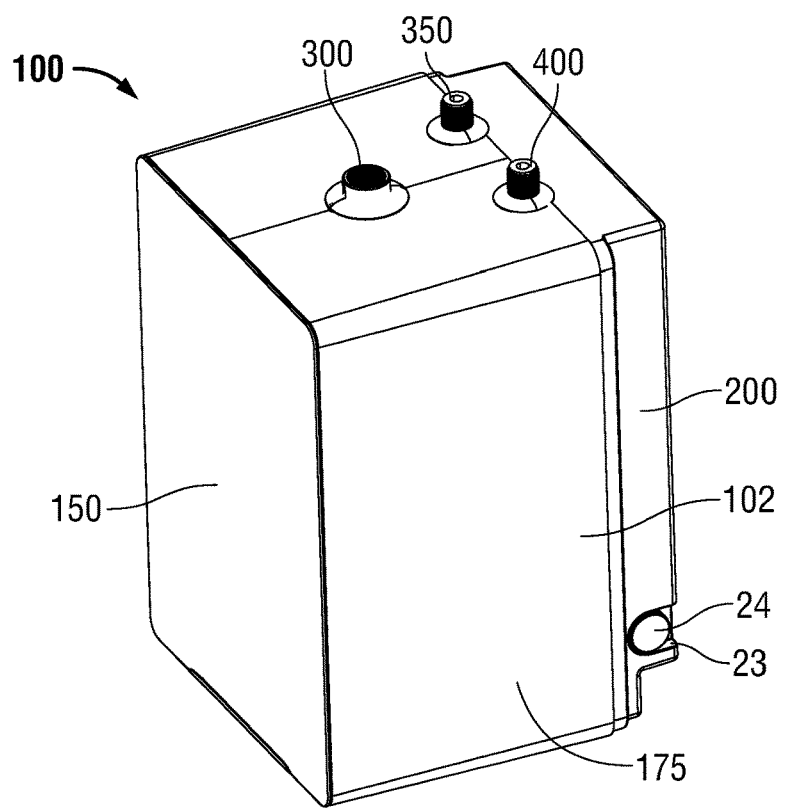
FIG. 2 illustrates one embodiment of the present invention in a partial side view from the bottom.

FIG. 2 illustrates one embodiment of the present invention in a partial side view from the bottom. As illustrated, water heater 100 is comprised of a rear housing 200, a casing 170, a casing bottom 302 and a front face 150. As shown, in several embodiments, the rear housing 200, casing 170, casing bottom 302, and front face 150, are comprised of noncorrosive and industry materials as utilized with a water heater. In several embodiments, front face 150 may be constructed of tempered glass. In several embodiments, the rear housing 200, casing 170, casing bottom 302 and front face 150, can mechanically engage to form a containment vessel 102 with a hollow interior. In several embodiments, containment vessel 102 is designed to house a water heater tank in inner holding tank 31 (See FIG. 3).

Figure 3:
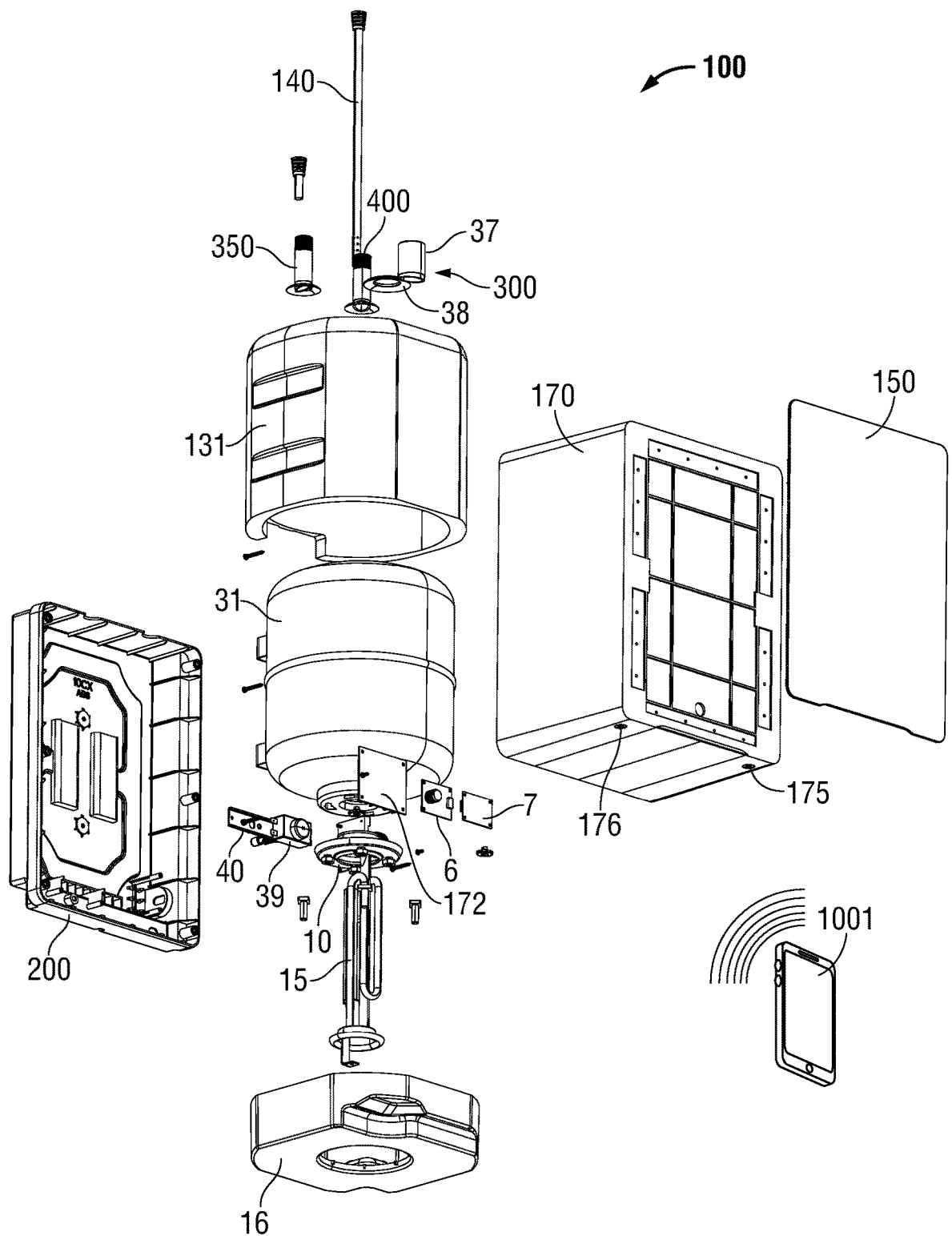
FIG. 3 illustrates one embodiment of the present invention in exploded view.

Further illustrated in FIG. 3, temperature and relief valve connector 300, cold water intake connector 400, and hot water outlet connector 350 are in mechanical attachment with casing bottom 302 (See FIG. 1). In several embodiments, temperature and relief valve connector 300 can be comprised of rubber covered hardened materials, or other suitable material. In several embodiments, temperature and relief valve connector 300 covers the inlet pipe guider 37 (FIG. 3). In several embodiments, cold water intake connector 400 is comprised of temperature resistant materials, which can be, but are not limited to, steel. In several embodiments, hot water outlet connector 350 is comprised of temperature resistant materials, which can be, but are not limited to, steel. Further illustrated on FIG. 2 are the manual control knob 24 and temperature control product control board or "PCB" 23 located on opposite sides of rear housing 200. In several embodiments, manual control knob 24 and temperature control PCB 23 can be adjusted to control water temperature.

FIG. 3 illustrates one embodiment of the present invention in exploded view. As illustrated, water heater 100 is comprised of a rear housing 200, a casing 170 and a front face 150. As shown, in several embodiments, the rear housing 200, casing 170, and front face 150, are comprised of noncorrosive and industry materials as utilized with a water heater. Further shown, are foot pads 175 and 176. Further illustrated are Wi-Fi Control Board 7, On and Off Control Board 172, and Front Product Control Board 6. In several embodiments, Wi-Fi Control Board 7 is an assembly of electronic components to provide control over the water heater connection to wireless networks that interface with the smart home technology. It is also used for connecting to external third-party applications. In several embodiments, On and Off Control Board 172 and Front Product Control Board 6 are controls for the smart button, which is used to turn the product on and off and indicates product errors through blinking patterns and color patterns.

In some embodiments, the present invention has an inner holding tank 31. In several embodiments, inner holding tank 31 is sometimes comprised of steel. In several embodiments of the present invention, inner holding tank 31 can be ensconced inside insulator 131. In several embodiments, insulator 131 is comprised of polyurethane. In several embodiments, the inside insulator 131 is a preformed shell that is premolded. This allows for an increase in ability to service the product. Further shown in FIG. 3, are cold water intake connector 400 and hot water outlet connector 350. In several embodiments, cold water intake connector 400 and hot water outlet connector 350 are in fluid communication with inner holding tank 31. In some embodiments, inlet pipe guider 37 is in sealing communication with temperature relief valve connector 300 or rubber ring 38 and temperature and relief valve connector 300 to cover the inlet pipe guider 37. Further shown is inlet pipe 140, which is in mechanical and fluid communication with the inner holding tank 31. In several embodiments, inlet pipe 140 guides water into the inner holding tank 31. This provides proper mixture of cold and hot water to maximize hot water output efficiency.

In some embodiments, the inner holding tank 31 attaches to solid base 16. In several embodiments, as illustrated, is flange cover 10. Flange cover 10 is connected to magnesium anode rod 15, which is in communication with inner holding tank 31. In several embodiments, rod 15 is an advanced material that helps with reducing scale and lime build-up, extending the life expectancy. As shown, in some embodiments, there is a temperature limiter and reset button 39 and a temperature limiter bracket 40. In several embodiments, bracket 40 ensconces the reset button 39, and in several embodiments is built in extra safety to prevent from overheating.

Figure 4:
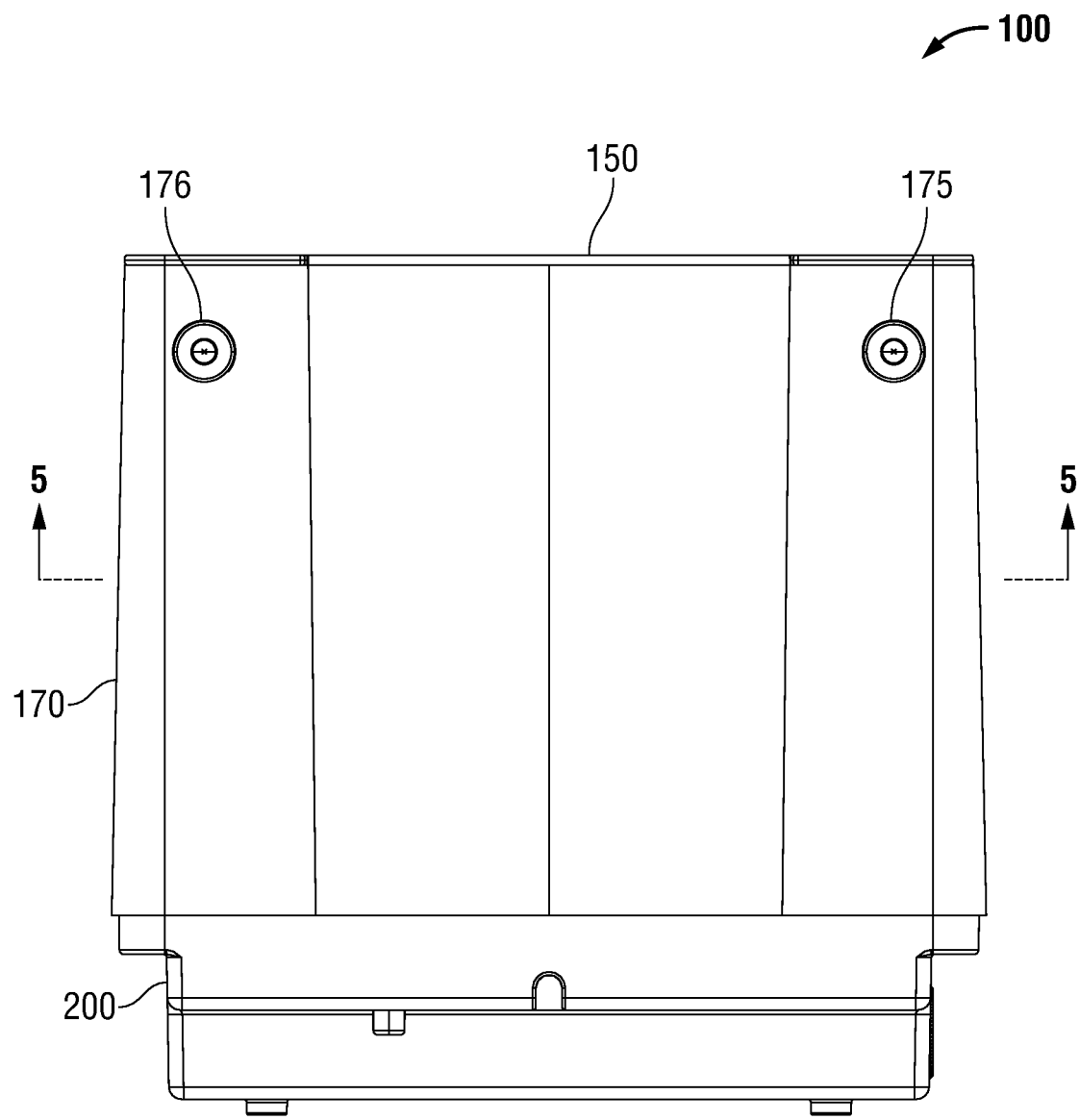
FIG. 4 illustrates one embodiment of the present invention in a top view.

FIG. 4 illustrates one embodiment of the present invention in a bottom view. As illustrated, water heater 100 is comprised of a rear housing 200, a casing 170 and a front face 150. As shown, in several embodiments, the rear housing 200, casing 170, and front face 150, are comprised of noncorrosive and industry materials as utilized with a water heater. Further shown are foot pads 175 and 176. In several embodiments, front face 150 may be constructed of tempered glass. In several embodiments, the rear housing 200, casing 170, and front face 150, can mechanically engage to form a containment vessel 102 with a hollow interior. In several embodiments, containment vessel 102 is designed to house a water heater tank in inner holding tank 31 (See FIGS. 2 and 3).

Figure 5:
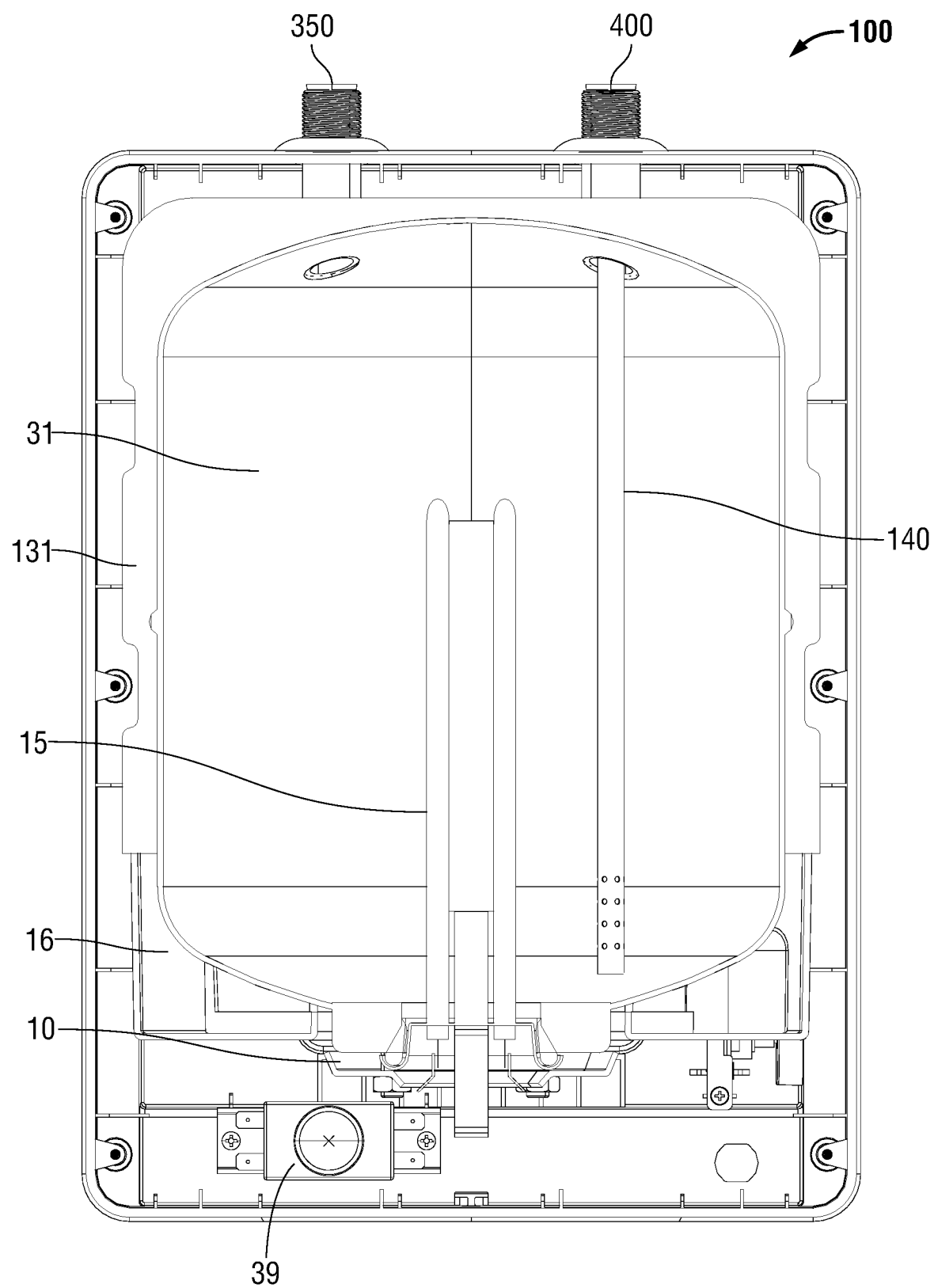
FIG. 5 illustrates one embodiment of the present invention in a front cross-sectional view.

FIG. 5 illustrates one embodiment of the present invention in a front cross-sectional view. As shown, in some embodiments, there is a temperature limiter and reset button 39. Further shown is flange cover 10 connected to magnesium anode rod 15, which is in communication with inner holding tank 31. In several embodiments of the present invention, inner holding tank 31 can be ensconced by insulated foaming or insulator 131. In several embodiments, insulated foaming or insulator 131 is comprised of a polyurethane. Further shown in FIG. 3, are cold water intake connector 400 and hot water outlet connector 350. In several embodiments, cold water intake connector 400 and hot water outlet connector 350 are in fluid communication with inner holding tank 31. Further shown is inlet pipe 140, which is in mechanical and fluid communication with inner holding tank 31, and it guides cold water to the bottom of the product to help with cold and hot water separation, which helps with efficiency with heating water.

In several embodiments, the present invention utilizes a mobile app, or electronic application 1001 (see FIG. 6) that allows a user to control functions such as on/off and temperature adjustments. In several embodiments, the mobile app, or electronic application 1001 is compatible with current technology smart devices, allowing a user voice command capability.

In several embodiments, the water heater 100 can be used in most boats, campers, tiny homes, RV's, homes, under the sink, offices, cottages, kitchens, utility rooms, apartments, and food trucks. In several embodiments, the present invention is designed to supply hot water for all handwash and kitchen sinks in residential environments. In several embodiments, the present invention can replace traditional central hot water heaters, thereby conserving water and reducing, energy waste.

In several embodiments, the present inventive heaters 100 and 1000 (FIG. 6) are lightweight, compact, and manufactured for easy installation. In several embodiments, the present inventive heaters 100 and 1000 can be mounted on the wall with included hardware, or they can be placed freestanding. In several embodiments, the inventive heaters 100 and 1000 can be designed to operate at 150-psi maximum water pressure. In several embodiments, the inventive heaters 100 and 1000 come with an electronic application 1001 for your mobile device that can be downloaded from a standard application store.

In several embodiments, the water heater 100 comes in 2.5-gallon and 4-gallon model sizes. Several embodiments of the present invention utilize a pressure vessel (water tank) that is welded, glass-lined and is equipped with an anode rod.

In several embodiments of the invention, before connecting the power, a user can fill the inner holding tank 31 and system with water and check for leaks, to be sure that all remaining air is out of the water heater 100.

In several embodiments, a user can download an electronic application 1001 to start calibrating and using the heated water. In several embodiments, once electronic application 1001 is installed, a login is created, and the application is connected to the water heater. In several embodiments, a user can follow the directions on screen and make sure the temperature knob, located on the back-right side of the water heater, is set to Wi-Fi mode to complete the process.

In several embodiments, once a user connects electronic application 1001 to the present invention, a user will be able to remotely control the temperature and on/off status of the water heater 100. In several embodiments, there is an energy statistics screen that will allow a user to track usage and help manage a water heater's energy consumption.

In several embodiments, the present invention works with electronic application 1001 and voice control in several known voice command packages.

In several embodiments, the invention as disclosed in FIGS. 1-5 operates in the following manner: in several embodiments of the present invention, sensors detect temperatures and electricity used; data is then sent to the cloud, and formulas are used to display details to the end user such as consumption, usage, efficiency, errors and any other applicable information. The present invention Smart Home application displays all the information to the end user at any given moment. Voice commands can be used through several known interfaces to control this product.

In several embodiments, communications are sent through our Wi-Fi chip to the cloud to enable this. Water will flow up through cold water intake connector 400 and then into inner holding tank 31, where it is heated by anode rod 15, and then can egress out of inner holding tank 31 through hot water outlet connector 350. In several embodiments, hot water outlet connector 350 connects to hot water plumbing.

In several embodiments, the water heater, as illustrated in FIGS. 1-5, features unique technologies, features and functions. It comes with a wireless remote control to adjust water temperature, ecco mode to limit power output (Gas and top end power) and to turn off/on. The remote uses RF 433 Mhz transfer frequency so that you can adjust settings from a distance away. This allows users to be in a different room and turn the water temp up, down, on/off or make additional modifications.

In several embodiments, this water heater has other unique features and technology. In several embodiments, the water heater utilizes a PCB with Wi-Fi built into it. The Wi-Fi enables end-users to connect the water heater to your home network to use advanced features such as voice commands. If a customer has a commercially available command device, they can use those devices to send commands to their water heater by simply speaking. In several embodiments, the water heater is 100% compatible to the commercially available command devices, which makes it "smart".

In several embodiments, the invention has proprietary programing built into the PCB and the mobile application to do other things. In several embodiments, the application can control water temp, set usage timers, schedule usage times, display water input flow based on liters/gallons, incoming/outgoing water temperatures, Ecco Mode on/off to limit output power and Statistics. In several applications, all of these functions are in real time.

In several embodiments, the application can send notifications for cleaning, product errors and messages. The statistics section of the application tells you how much water, gas and electricity are used daily, monthly and yearly. The application can also tell the cost of all this usage. Cost statistics can be based on a pre-determined set price or national average. An end user can input actual cost per Liter, Kilowatt, Gas, MC Cubic meter, SMC Standard Cubic meter, or any other variable that determines actual cost a customer is charged by a utility company.

In several embodiments, the present invention is the first advanced water heater that is 88K BTU's with a rating of 3 Gallons per minute (12 Liters).

In several embodiments, water comes into the incoming water inlet, passes through various sensors that send readings to both the Main PCB and Wi-Fi PCB, which then send that information through a home network. It then goes to the cloud and is translated into usable information in our mobile app. When the user has the application open, they can then control, view, and adjust the water heater. The water heater also has voice command capability via a voice command device making it a smart product. The present invention is also one of the first to send notifications to customers to clean the water heater to make sure it is running at 100% efficiency. This is measured based on how much water has moved through the product. In several embodiments, the invention only measures water consumption and electricity. It can then put a cost to these uses. In several embodiments, the present invention can come in, scalable sizes. In several embodiments, the present invention has a manual mode technology built in. This means that a user can adjust the water heater on a mobile application and adjust the water heater temperature on the backside of the product. If there is no internet, the user can switch to manual mode.

In several embodiments, the present invention works as follows: Water flows into the water heater. Flow sensors, temperature sensors, and other sensors take this information and send it to the product control board. Sensors send information such as electricity usage, water flow, water temperature, gas usage, and water usage to the PCB. The PCB then sends this information through the user's network, to the cloud, then to the mobile app/computer to display it. As the water heater is being used, multiple sensors are relaying this information in real time to the user. When the user makes adjustments via app/computer, this information is then sent back to the product, and the PCB makes necessary changes.

Figure 6:
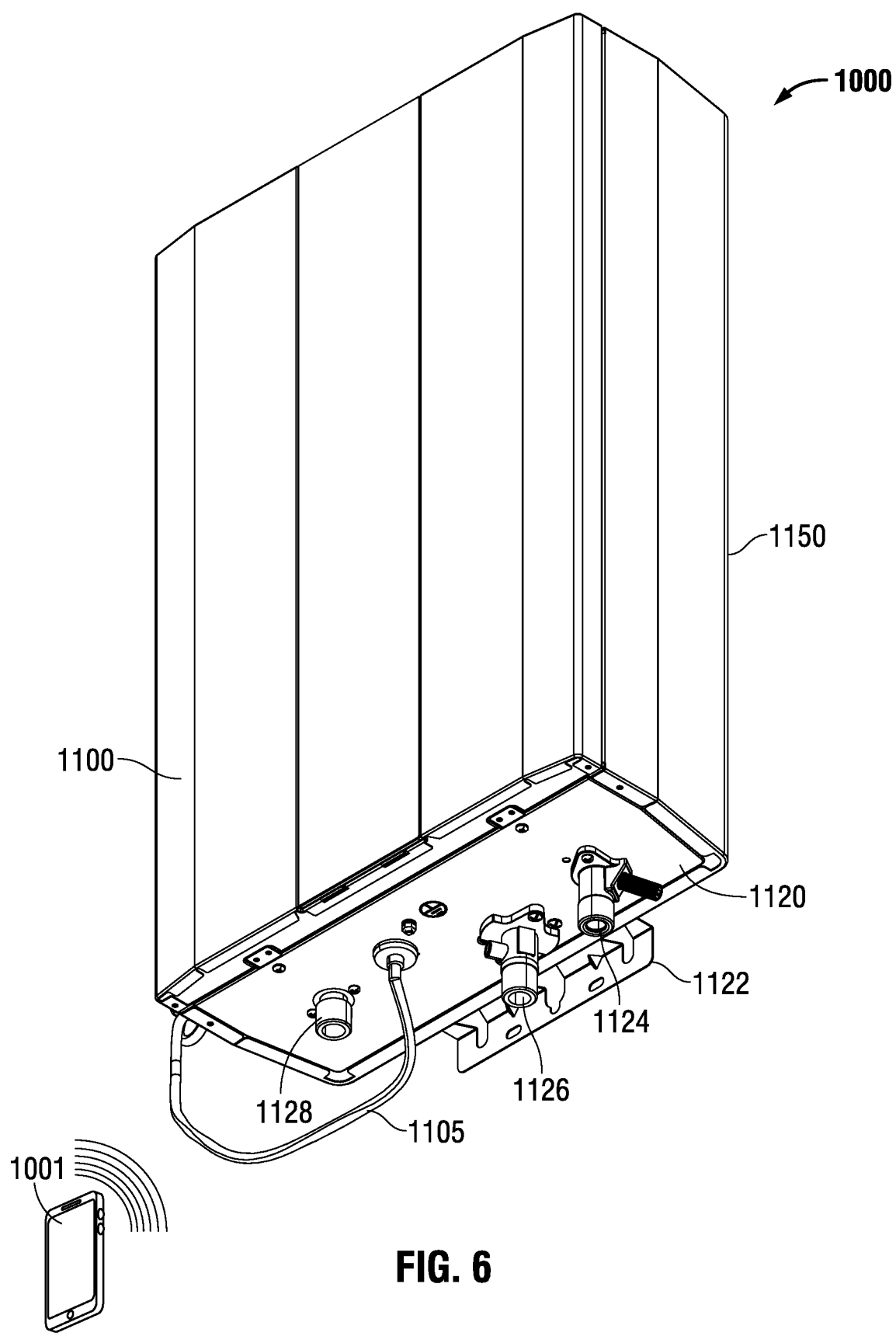
FIG. 6 illustrates one embodiment of the present invention in a partial side view from the front and bottom.

FIG. 6 illustrates one embodiment of the present invention in a partial side view from the front and bottom. As illustrated, tankless water heater 1000 is constructed with backing case 1150 and front casing or cover 1100. In several embodiments, backing case 1150 and front casing or cover 1100 are comprised of noncorrosive and industry materials as utilized with a water heater. In several embodiments, back casing 1150 can be comprised of steel, rubber, copper or plastic. As illustrated, tankless water heater 1000 is constructed with bottom case 1120. In several embodiments, bottom case 1120 is comprised of noncorrosive and industry materials as utilized with a water heater.

In several embodiments, the hot water outlet 1128 and the water inlet pipe 1124 are attached and in fluid communication with bottom case 1120. Further illustrated is gas inlet connector 1126. In several embodiments, gas inlet connector 1126 is preferably constructed to utilize natural gas or liquid propane. As illustrated, in some embodiments, there is electrical supply coil 1105 and a mounting bracket 1122. In some embodiments, mounting bracket 1122 is comprised of metal and is attached to backing case 1150.

Figure 7:
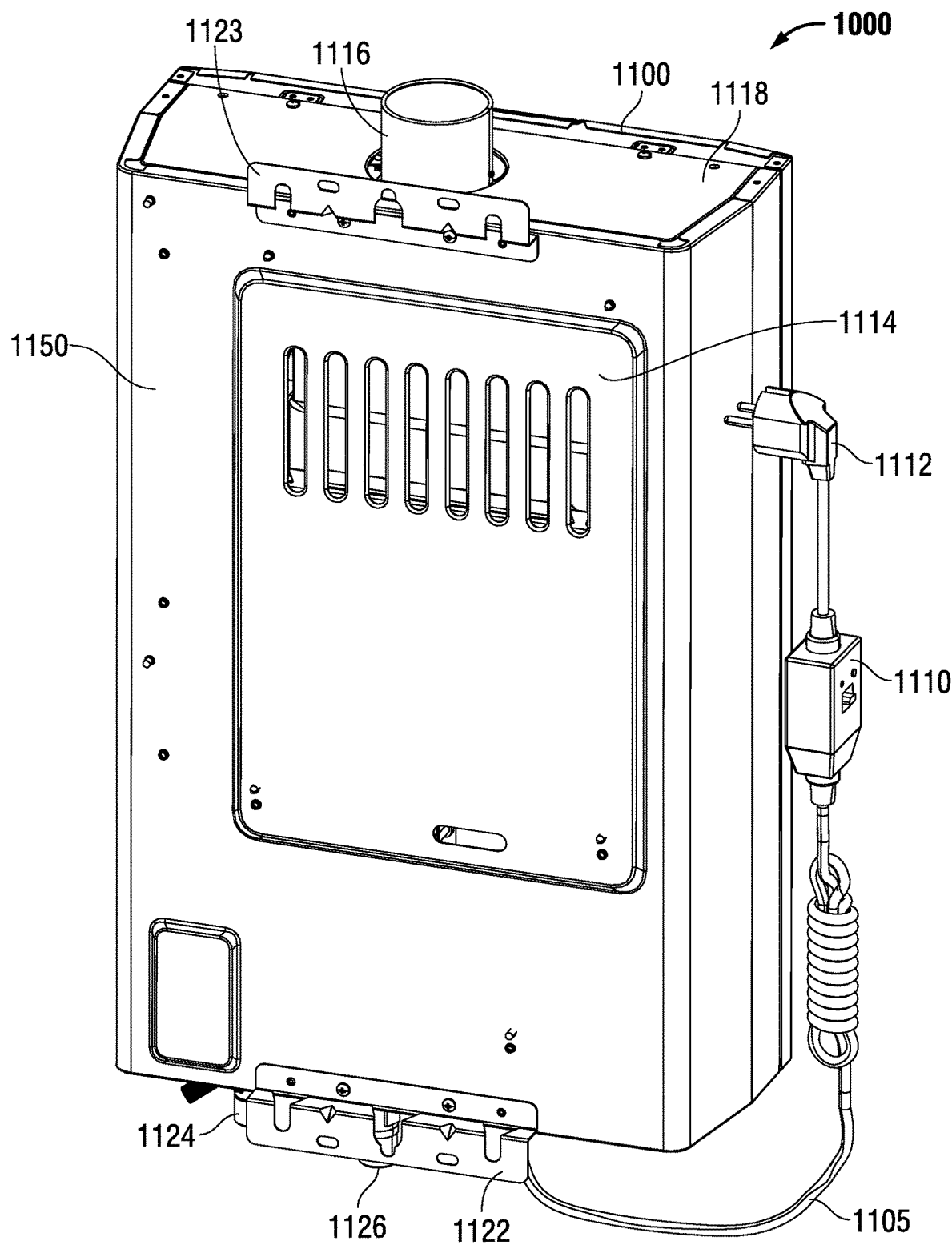
FIG. 7 illustrates one embodiment of the present invention in a partial side view from the back and top.

FIG. 7 illustrates one embodiment of the present invention in a partial side view from the back and top. As illustrated, tankless water heater 1000 is constructed with backing case 1150 and front casing or cover 1100. In several embodiments, backing case 1150 and front casing or cover 1100 are comprised of noncorrosive and industry materials as utilized with a water heater, in some embodiments, that can be steel. In some embodiments, the present invention has an air intake vent 1114 and a top cover 1118. In several embodiments, air intake vent 1114 and top cover 1118 are comprised of noncorrosive and industry materials as utilized with a water heater. In several embodiments, exhaust 1116 passes through top cover 1118 and in the interior of the tankless water heater 1000. Further illustrated, in some embodiments, is top mounting bracket 1123, attached to backing case 1150. In several embodiments, the air intake vents are uniquely placed to allow air to come in and operate the product.

In several embodiments, the water inlet pipe 1124 is attached and in fluid communication with bottom case 1120 (See FIG. 6). Further illustrated is gas inlet connector 1126. In several embodiments, gas inlet connector 1126 is preferably constructed to allow a user to connect his gas line to power the product. As illustrated, in some embodiments, there is an electric supply coil 1105, which is attached to a breaker or regulator 1110 and power plug 1112. In several embodiments, the water heater has a smart button on the front which turns the product on or off or displays error codes. The mobile application and wireless remote control controls the product. The wireless remote control uses 433 Mhz transfer frequency to control the product. It is limited to functions such as on/off, temperature adjustment, and eccomode. Eccomode is used to limit output to 75%. All other controls, including statistics, errors, notifications, scheduling, and timer are limited to mobile app.

Figure 8:
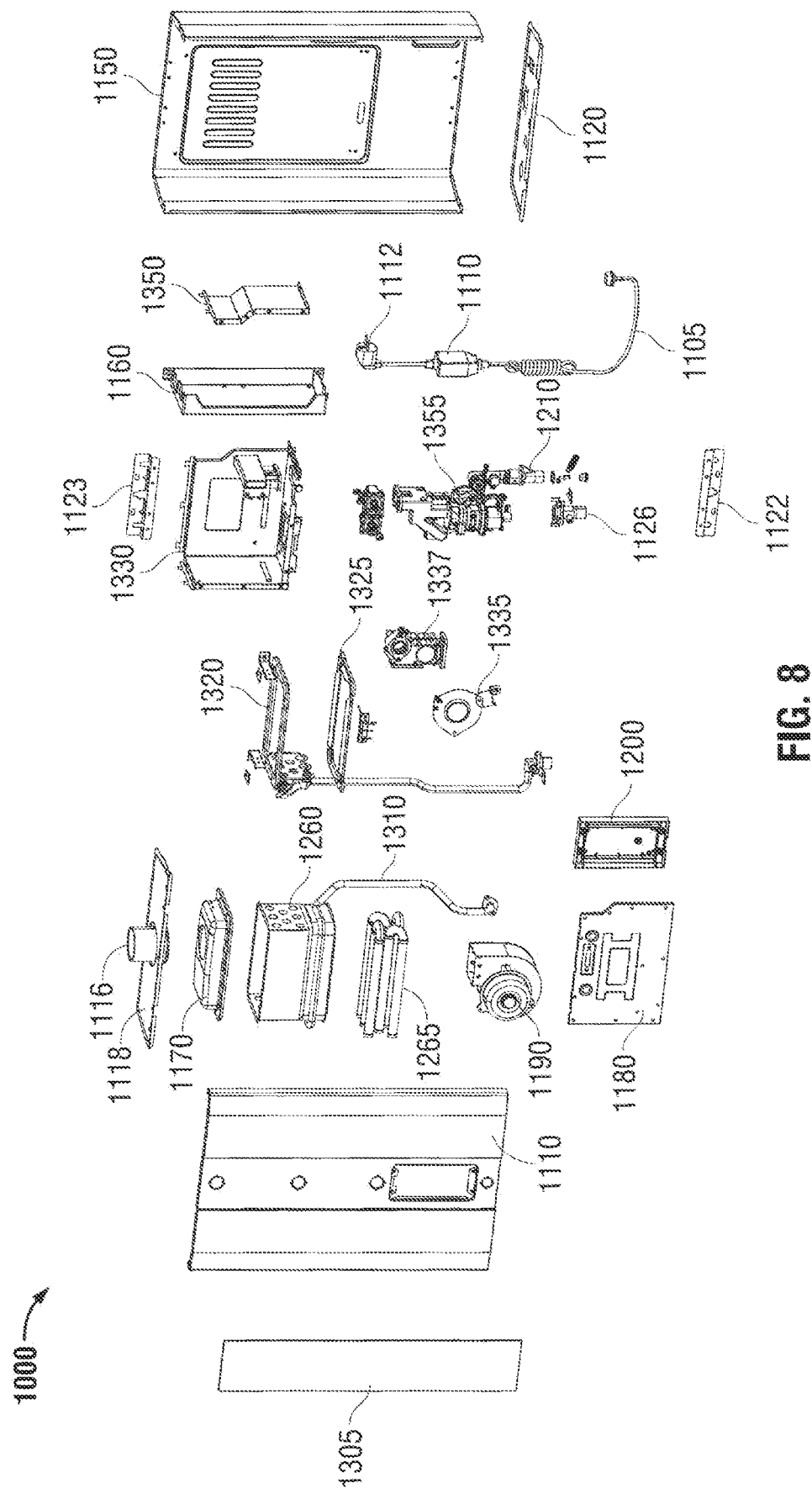
FIG. 8 illustrates one embodiment of the present invention in an exploded view.

FIGS. 7 and 8 illustrate one embodiment of the present invention in an exploded view. As illustrated, tankless water heater 1000 is constructed with backing case 1150 and front casing or cover 1100. In several embodiments, backing case 1150 and front casing or cover 1100 are comprised of noncorrosive and industry materials as utilized with a water heater. In some embodiments of the present invention, there is air intake vent 1114 (See FIG. 7) and a top cover 1118. As illustrated, in some embodiments, tankless water heater 1000 is constructed with bottom case 1120.

Further illustrated in FIG. 8, in some embodiments, there is an electric supply coil 1105, which is attached to a regulator or breaker 1110 and power plug 1112. Further illustrated, are side of burner 1350 and PCB Box 1160, which are preferably designed to protect the control board, which receives and transmits data that a user can utilize to regulate the functional aspects of the present invention. In some embodiments, there is burner chamber box 1330, which is designed in the manner as used in the state of the art. Further illustrated is gas proportional valve 1355 and gas inlet connector 1126. Further illustrated is water inlet sensor 1210. In several embodiments, gas proportional valve 1355 is where gas is distributed based on demand, so the product can heat water. In several embodiments of the present invention, motors utilized can be DC motors. In several embodiments, gas proportional valve 1355 distributes gas into the heat exchanger to heat the water.

In several embodiments, as illustrated, are top frame 1320 and mid frame 1325, which may be comprised of copper, as well as heat exchanger 1265, which also can be comprised of copper. Also shown is fan assembly bracket 1335, which is designed in the manner as used in the state of the art. As shown, the heat exchanger 1265 is designed to intake fluid into the system for the purpose of heating the liquid. Further shown is top frame 1320 and mid-frame 1325, which are preferably designed to hold various heating and control units for the present invention which are part of the heat exchanger.

Also found in several embodiments of the present invention is display assembly 1200 and burner cover plate 1180. As illustrated, display assembly 1200 is preferably designed to display information in an electronic format. As illustrated, burner cover plate 1180 is preferably designed to operate as a burner cover plate as is known in the art. Further illustrated is DC fan assembly 1190. DC fan assembly 1190 is of the type utilized in the industry for tankless water heaters.

Further illustrated is heat exchanger 1265. In several embodiments, heat exchanger 1265 is for heating the water. Further illustrated is heat exchanger 1310 and heater exchanger assembly 1260. In several embodiments, heater exchanger assembly 1260 operates to heat a fluid as is known in the art.

In several embodiments, heater exchanger assembly 1260 is capped with smoke hood 1170. As illustrated in several embodiments, top cover 1118 is comprised of materials as used in the art. In several embodiments, front casing or cover 1100 is further attached with front casing and front panel 1305. In several embodiments, front casing and front panel 1305 are comprised of noncorrosive and industry materials as utilized with a water heater. In several embodiments of the present invention, behind display assembly 1200 is where the wireless control and product on/off control is located. PCB Box 1160 holds the product control board, which controls the actual product.

Figure 9:
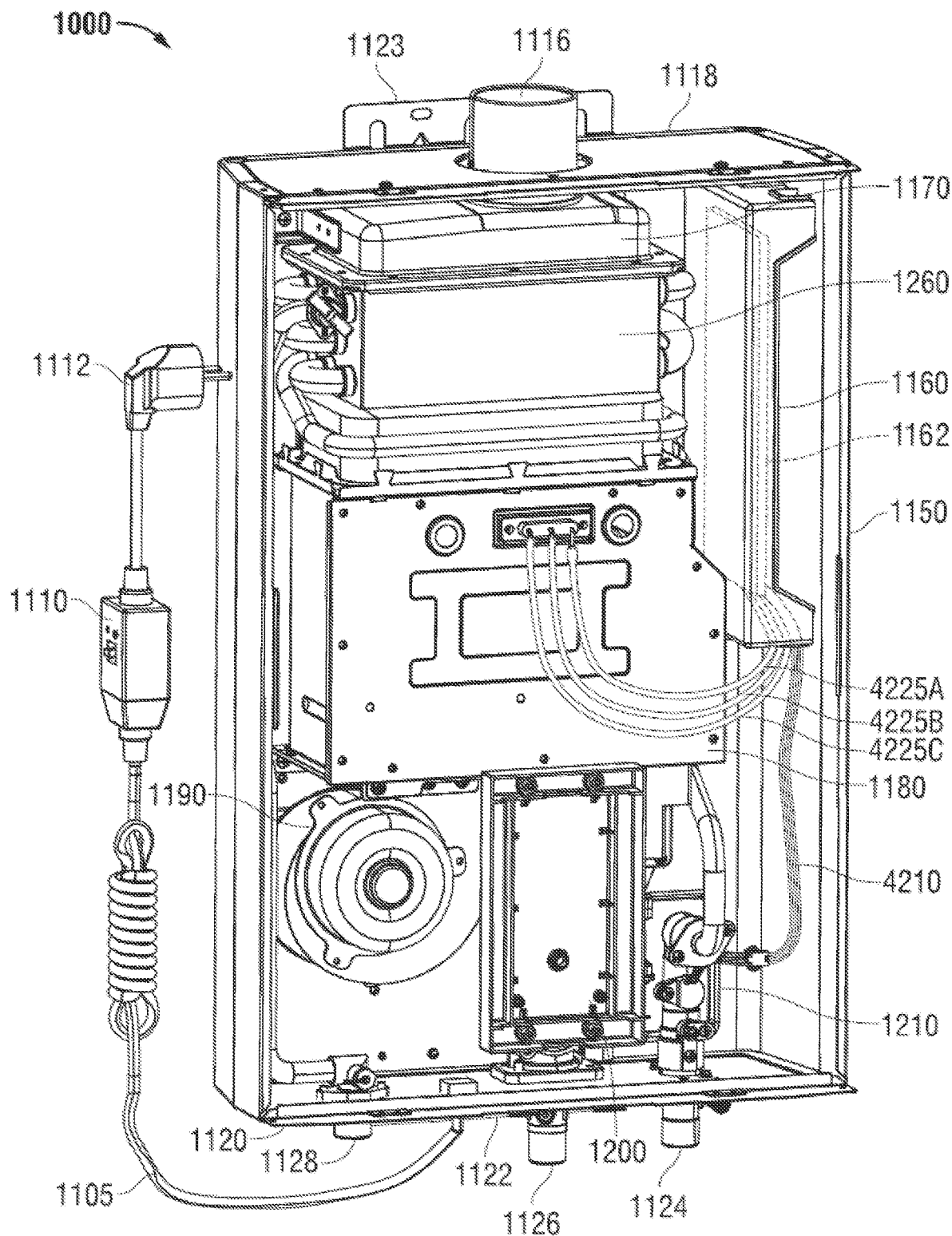
FIG. 9 illustrates one embodiment of the present invention in a front cross-sectional view.

FIG. 9 illustrates one embodiment of the present invention in a front cross-sectional view. In several embodiments, exhaust 1116 passes through top cover 1118 and in the interior of the tankless water heater 1000. Further illustrated, in some embodiments, is top mounting bracket 1123 attached to backing case 1150. In several embodiments, ambient air is taken into the present invention. In several embodiments, the water inlet pipe 1124 is attached and in fluid communication with bottom case 1120. Further illustrated is gas inlet connector 1126. In several embodiments, gas inlet connector 1126 is preferably constructed to connect a gas line. As illustrated, in some embodiments, there is an electric supply coil 1105, which is attached to a breaker or regulator 1110 and power plug 1112. Further shown is 4210, which is the water inlet sensor wire 4210. Further shown are heating element control wires 4225a-c which attach control box motherboard 1162. In several embodiments, control box 1162 can retrieve and send data inputs to various components via wires such as sensor wire 4210 and control wires 4225a-c. In several embodiments, control box 1162 can receive and send data through smart technology which includes, but is not limited to controlling data, maintenance data, and unit functionality data.

In several embodiments, the hot water outlet 1128 and the water inlet pipe 1124 are attached and in fluid communication with bottom case 1120. Further illustrated is gas inlet connector 1126. In several embodiments, gas inlet connector 1126 is preferably constructed to connect a gas line. As illustrated, in some embodiments, there is electrical supply coil 1105 and a mounting bracket 1122. In some embodiments mounting bracket 1122 is comprised of metal and is attached to backing case 1150. In several embodiments, mounting bracket 1122 secures the product control board into place.

Further illustrated, is PCB Box 1160, which is preferably designed to have a product control board cover to protect the product control board. Also found in several embodiments of the present invention is display assembly 1200 and burner cover plate 1180. As illustrated, display assembly 1200 is preferably designed to hold the Wi-Fi control board and the on/off button in place. As illustrated, burner cover plate 1180 is preferably designed to cover the burner in a manner known in the art. Further illustrated is DC fan assembly 1190. DC fan assembly 1190 is of the type utilized in the industry for tankless water heaters. Further illustrated is water inlet sensor 1210. Further illustrated, in some embodiments, is top mounting bracket 1123 attached to backing case 1150.

Figure 10:
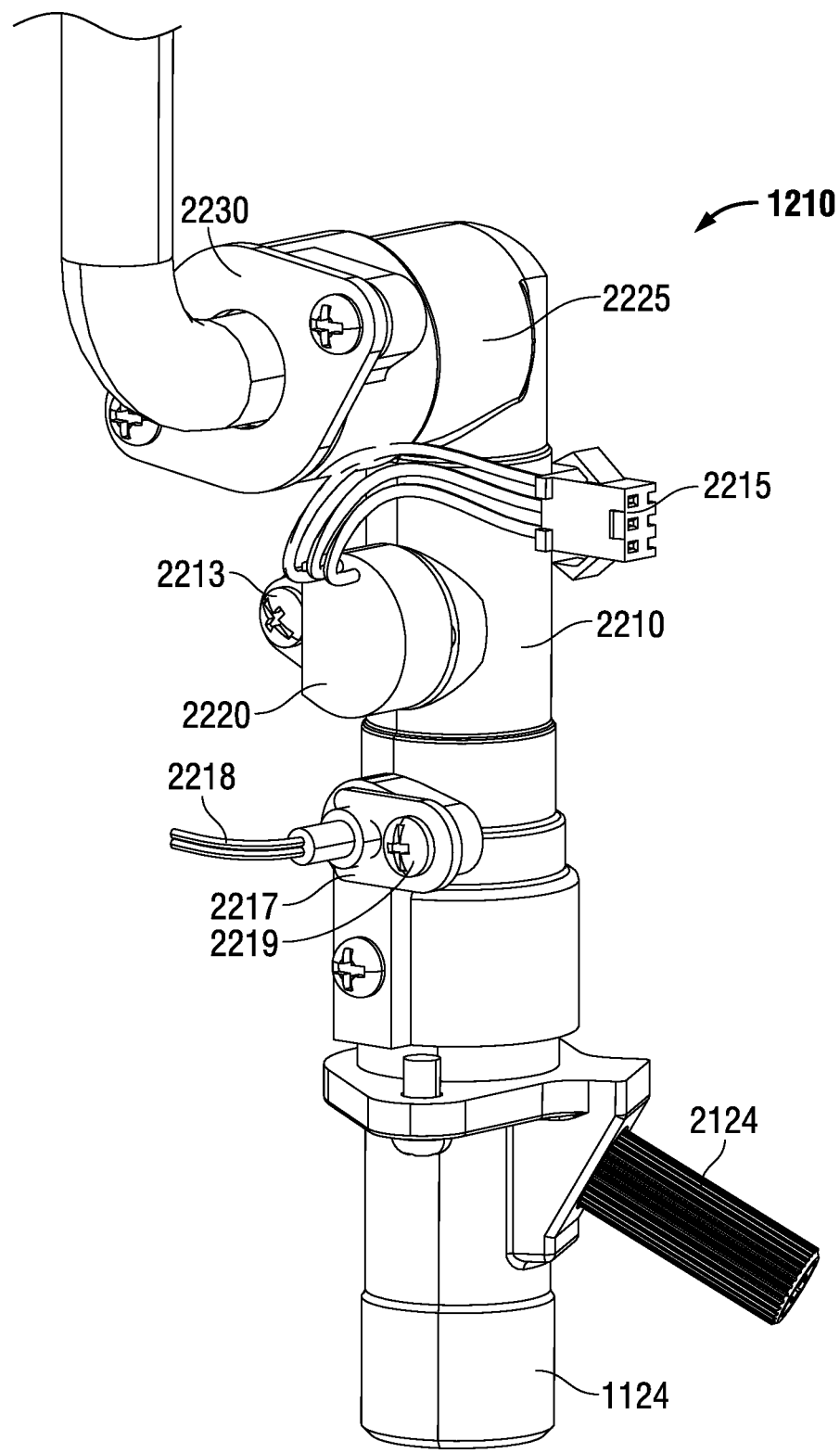
FIG. 10 illustrates one embodiment of the water inlet sensor in assembled view.

FIG. 10 illustrates one embodiment of the water inlet sensor in assembled view. As illustrated is one embodiment of the water inlet sensor 1210. As illustrated is one embodiment of water inlet pipe, or incoming water connector 1124. Further illustrated is water inlet connector 2124. In several embodiments, the water inlet connector 2124 has a pressure relief plug. If water pressure builds up, this relief plug releases water, so the product does not break. In several embodiments, connecting to water inlet sensor 1210 is temperature sensor connector bracket 2217 attached to thermostat/temperature sensor wire 2218, to monitor inlet water temperature, and secured to water inlet sensor 1210 by bolt, or screw 2219 in a manner typical of piping for water lines. Further illustrated in FIG. 10, is one embodiment of the L turn pipe connection and L turn connection 2230.

Further illustrated in FIG. 10 is upper connection pipe or water flow sensor body 2210 connected by bolt or screw 2213 to water flow sensor 2220, attached to sensor card or water flow sensor PCB connector 2215. In several embodiments, sensor card water flow sensor PCB connector 2215 can relay information to the PCB Box 1160 (See FIG. 9) for electronic control and monitoring of water events. In several embodiments, PCB connector 2215 is used to send information to the Wi-Fi control board, which sends this information to the mobile application. Further illustrated in FIG. 10, is one embodiment of the water valve connecting bracket 2230.

Figure 11:
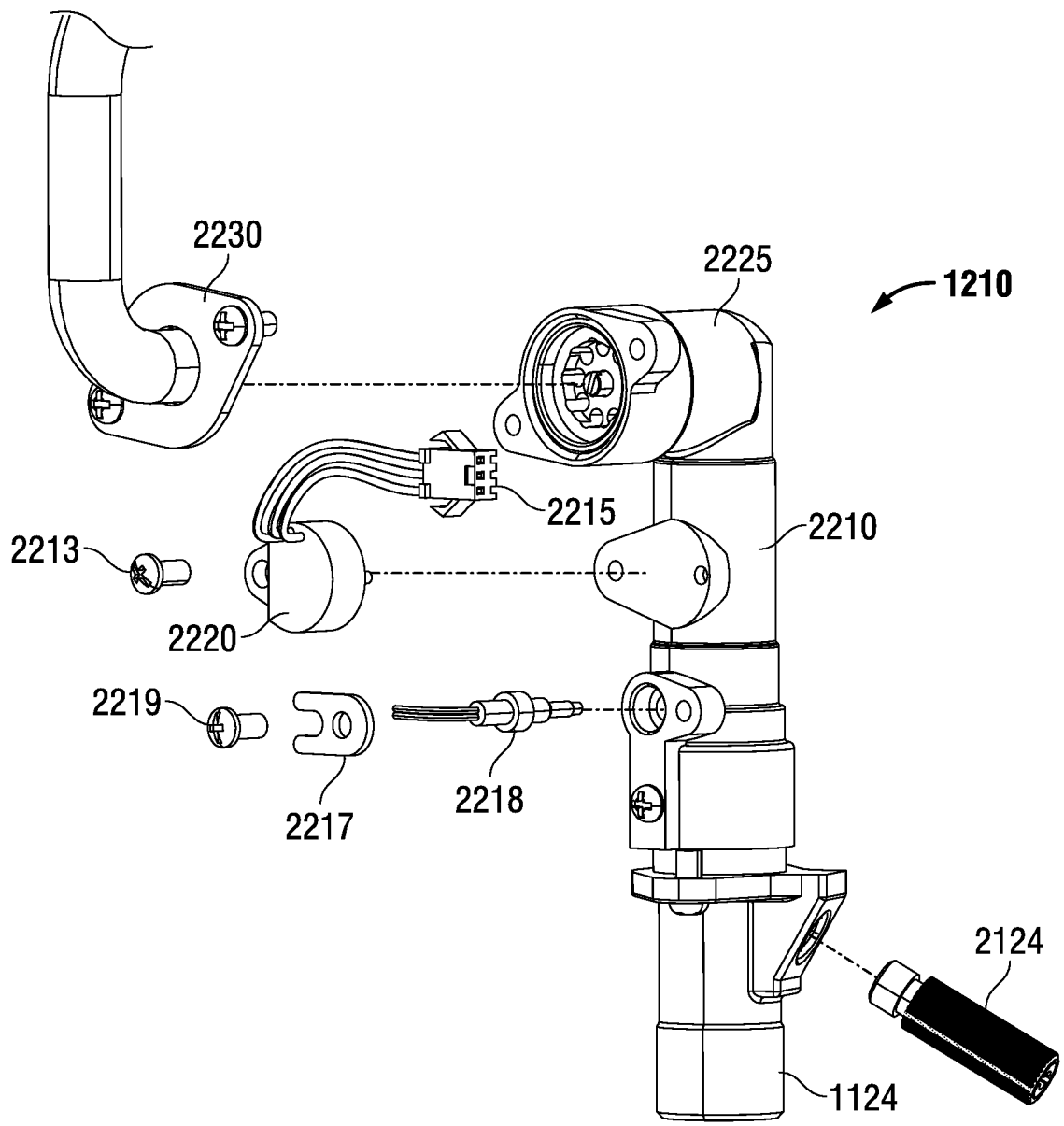
FIG. 11 illustrates one embodiment of the water inlet sensor in exploded view.

FIG. 11 illustrates one embodiment of the water inlet sensor in exploded view. Illustrated is upper connection pipe water flow sensor body 2210 connected by bolt or screw 2213 to water flow sensor 2220 attached to sensor card water flow sensor PCB connector 2215. In several embodiments, water flow sensor 2220 senses the flow of the water coming into the water heater. In several embodiments, sensor card or water flow sensor PCB connector 2215 can relay information to the PCB Box 1160 (See, FIG. 9) for electronic control and monitoring of water events. In several embodiments, water flow sensor 2220 relays water flow rates to the product control board. The PCB relays it to the Wi-Fi, the Wi-Fi sends it to the cloud, the cloud sends it to the application.

FIG. 10 illustrates one embodiment of the water inlet sensor in assembled view. As illustrated is one embodiment of the water inlet sensor 1210. As illustrated is one embodiment of water inlet pipe 1124. Further illustrated is water inlet connector 2124. In several embodiments, connected to water inlet sensor 1210 is temperature sensor connector bracket 2217 attached to thermostat/temperature sensor wire 2218 and secured to water inlet sensor 1210 by bolt or screw 2219 in a manner typical of piping for water lines. Illustrated is one embodiment of upper water flow sensor 2225. Further illustrated in FIG. 11, is one embodiment of the water valve connecting bracket 2230.

Figure 12:
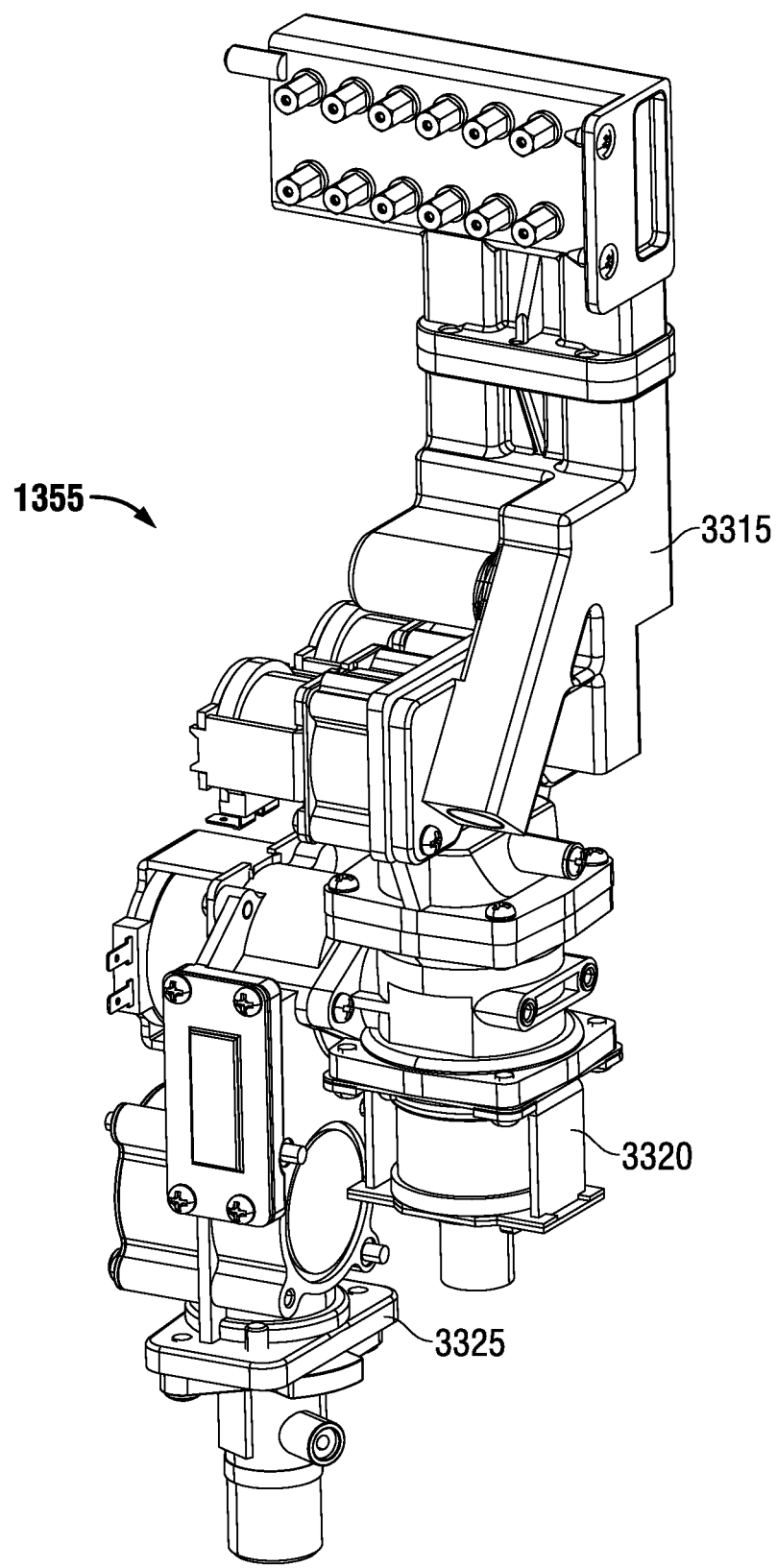
FIG. 12 illustrates one embodiment of the gas proportional valve in assembled view.

FIG. 12 illustrates one embodiment of the gas proportional valve in assembled view. As illustrated, gas proportional valve is assembled with three main parts. Lower portion, in some embodiments, is comprised of a gas proportional valve chamber 3325. Middle portion is comprised of a gas proportional valve chamber 3320. Upper portion is comprised of a lower burner assembly 3315.

Figure 13:
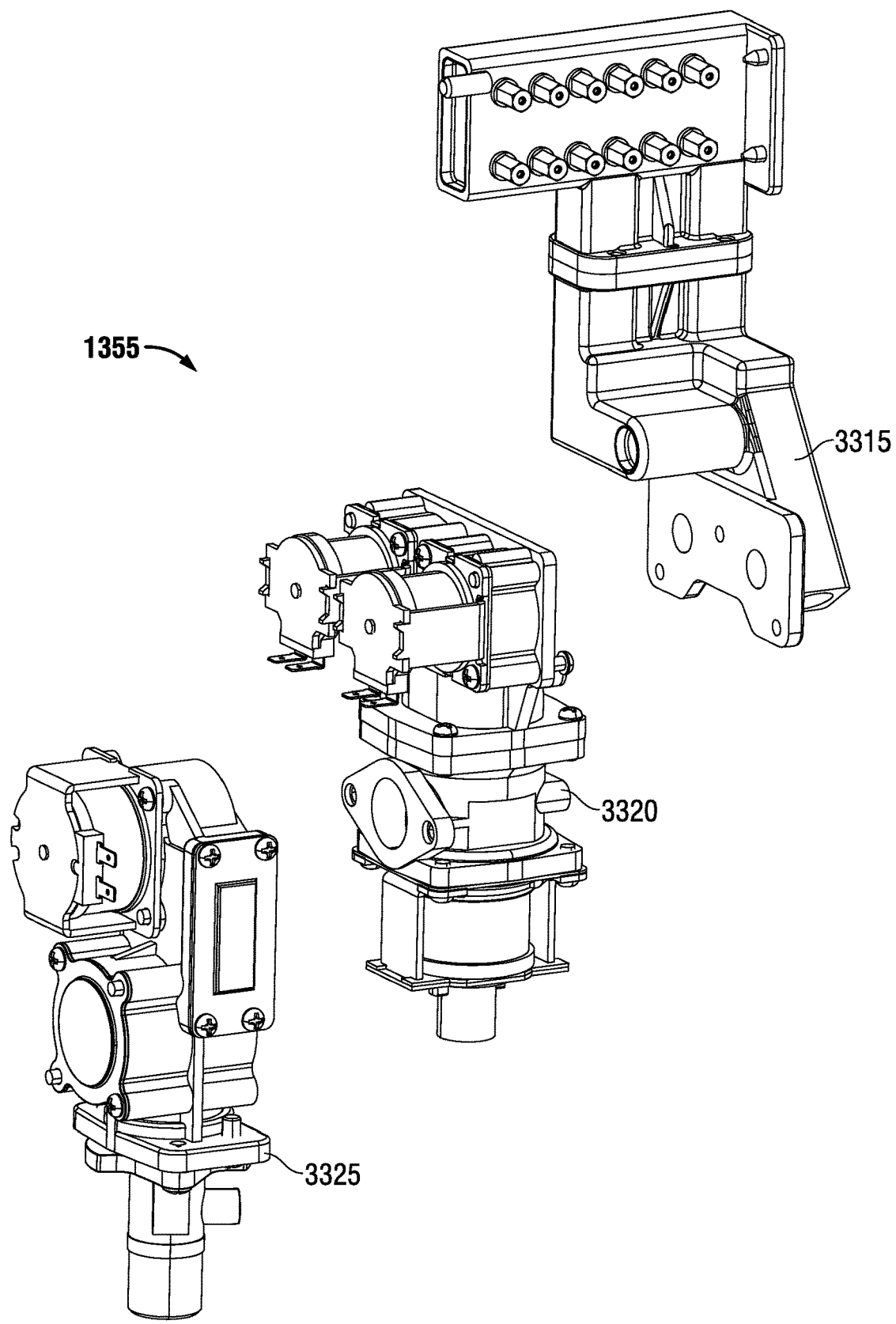
FIG. 13 illustrates one embodiment of the gas proportional valve in exploded view.

FIG. 13 illustrates one embodiment of the gas proportional valve in exploded view. As illustrated, the gas proportional valve is assembled with three main parts. Lower portion, in some embodiments, is comprised of a gas proportional valve chamber 3325. Middle portion is comprised of a gas proportional valve chamber 3320. Upper portion is comprised of a lower burner assembly 3315.

Figure 14:
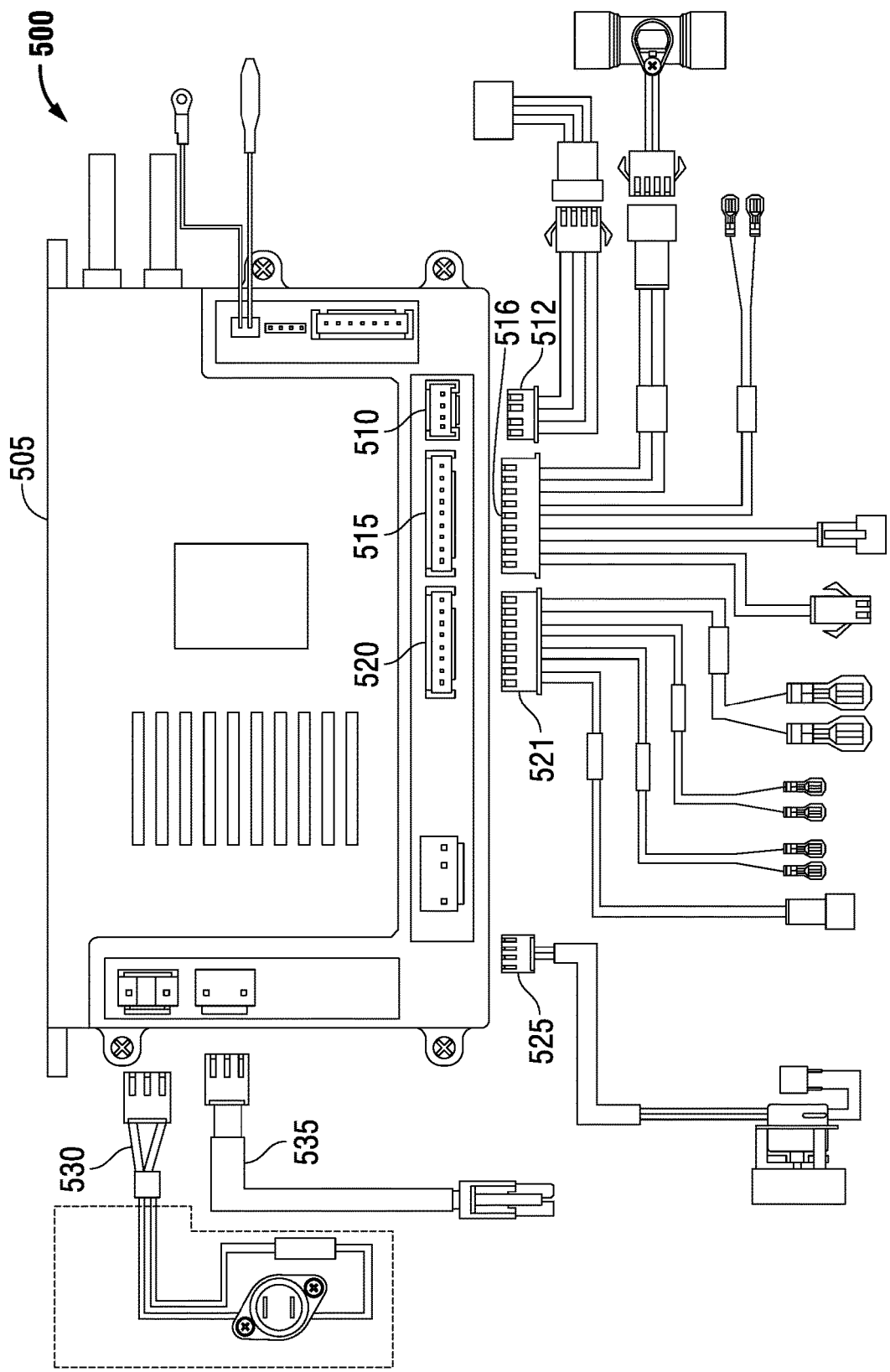
FIG. 14 illustrates one embodiment of the electrical wiring diagram for one embodiment of the present invention.

FIG. 14 illustrates one embodiment of the electrical wiring diagram for one embodiment of the present invention. As shown, is one embodiment of the electrical wiring diagram 500. As shown, is one embodiment of the antifreeze device 530 as utilized in some embodiments of the present invention. In several embodiments, electricity heats ceramic blocks, which in turns keeps the water from freezing. As shown is one embodiment of the power plug 535. In several embodiments, power plug 535 can function as a standard power plug as is known in the art. Further illustrated is fan blower electronic array 525. In several embodiments, fan blower electronic array 525 can relay and control the fan blower based on signals received and sent. Further illustrated is valve electronic array 521. In several embodiments, valve electronic array 521 can relay and control the individual or groups of valves on the invention based on signals received and sent. Further illustrated, is outlet and pressure electronic array 516. In several embodiments, outlet and pressure electronic array 516 can relay and control the outlet and pressure electronics based on signals received and sent. Further illustrated, is display electronic array 512. In several embodiments, display electronic array 512 can display information electronically as is known in the art.

As further shown in FIG. 14, there is outlet 520 on circuit board 505 which can mechanically and electrically engage valve electronic array 521. Further shown is outlet 515 on circuit board 505 which can mechanically and electrically engage outlet and pressure electronic array 516. Further shown is outlet 510 on circuit board 505 which can mechanically and electrically engage display electronic array 512.

FIG. 3 and FIG. 6 also illustrate the electronic application 1001. In several embodiments of the present invention, the electronic application 1001 can be a "smart" technology that interacts and interfaces with the Wi-Fi Control Board 7, On and Off Control Board 172, and Front Control Product Control Board 6 through electronic signals, therein allowing for the regulation of controls of the water heater 100. In several embodiments, the electronic application 1001 uses RFID technology to transmit and receive signals from the Wi-Fi Control Board 7, On and Off Control Board 172, and/or Front Control Product Control Board 6. In several embodiments, said temperature limiter and reset button 39 is controlled remotely using an electronic application 1001. In several embodiments, said water heater 100 is electric powered. In several embodiments, said PCB Box 1160 is controlled remotely using an electronic application 1001. In several embodiments, said water inlet sensor 1210 is controlled remotely using an electronic application 1001.

In several embodiments of the present invention, the electronic application 1001 can be a "smart" technology that interacts and interfaces with the Wi-Fi Control Board 7, On and Off Control Board 172, and/or Front Control Product Control Board 6 through electronic signals, therein allowing for the regulation of controls of the water heater 100. In several embodiments, the electronic application 1001 uses rate of frequency technology to transmit and receive signals from the Wi-Fi Control Board 7, On and Off Control Board 172, and/or Front Control Product Control Board 6. In several embodiments, the present invention utilizes a phone which uses Wi-Fi to connect to the product via home network. In several embodiments, a 433 hertz transfer frequency is what the wireless remote control uses.

In several embodiments, the water heater, as illustrated in FIGS. 6-14, features unique technologies, features and functions. It comes with a wireless remote control to adjust water temperature, ecco mode to limit power output (Gas and top end power) and to turn off/on. The remote uses RF 433 Mhz transfer frequency so that you can adjust settings from a distance away. This allows users to be in a different room and turn the water temp up, down, on/off.

In several embodiments, this water heater has other unique features and technology. In several embodiments, the water heater utilizes a PCB with Wi-Fi built into it. The Wi-Fi enables end-users to connect the water heater to your home network to use advanced features such as Voice commands. If a customer has a commercially available command device, they can use those devices to send commands to their water heater by simply speaking. In several embodiments, the water heater is 100% compatible to the commercially available command devices, which makes it "smart".

In several embodiments, the invention has proprietary programing built into the PCB and the mobile application to do other things. In several embodiments, the application can control water temp, set usage timers, schedule usage times, display water input flow based on liters/gallons, incoming/outgoing water temperatures, Ecco Mode on/off to limit output power and Statistics. In several applications, all of these functions are in real time.

In several embodiments, the application can send notifications for cleaning, product errors and messages. The statistics section of the application tells you how much water, gas and electricity are used daily, monthly and yearly. The application can also tell the cost of all this usage. Cost statistics can be based on a pre-determined set price or national average. An end user can input actual cost per Liter, Kilowatt, Gas, MC Cubic meter, SMC Standard Cubic meter or any other variable that determines actual cost a customer is charged by a utility company. In several embodiments, the present invention is the first advanced water heater that is 88K BTU's with a rating of 3 Gallons per minute (12 Liters). In several embodiments, water comes into the incoming water inlet, passes through various sensors that send readings to both the Main PCB and Wi-Fi PCB, which then sends that information through a home network. It then goes to the cloud and is translated into usable information in our mobile app. When the user has the application open, they can then control, view, and adjust the water heater. The water heater also has voice command capability via a voice command device making it a smart product. The present invention is also one of the first to send notifications to customers to clean the water heater to make sure it is running at 100% efficiency. This is measured based on how much water has moved through the product. In several embodiments of the present invention, the electronic application 1001 is a voice command module. In some embodiments, the electronic application 1001 is a RF wireless remote. In some embodiments, the electronic application 1001 utilizes a smart technology to control a water heater or tankless water heater. In some embodiments, the electronic application 1001 utilizes an "In Voice" commanded on/off application. In some embodiments, the electronic application 1001 utilizes a voice command temperature adjustment. In some embodiments, the electronic application 1001 can provide a cleaning/descaling/error notification via mobile SMS text, email, in app/text alerts. In some embodiments, the electronic application 1001 will send notifications to the customers to let them know when it's time to clean their tankless water heater. In some embodiments, electronic application 1001 is an ecco-mode technology setting that allows the water heater to run at half the power usage.

In some embodiments, electronic application 1001 utilizes "Smart Button" technology. In some embodiments, electronic application 1001 has one single button that flashes in certain ways to indicate an error, or when not connected to a network.

In some embodiments, the electronic application 1001 utilizes a programming built into an application to let customers input KWH electricity rates and Gas consumption rates they receive from a utility company to give them accurate product energy consumption costs.

In several embodiments, electronic application 1001 utilizes a real time dashboard that shows actual input/output water temperature and water flow.

In several embodiments, the operation of water heater 1000 requires a minimum water flow rate of 0.6 GPM to activate and 0.8 GPM to maintain activation. In several embodiments, to maintain proper performance, ensure sufficient water supply pressure, the Required Water Flow Rate=MM. Operating Water Pressure (0.8 GPM)+Pipe Pressure Loss+Faucet and Shower Pressure Loss+Safety Margin (more than 5 psi). In several embodiments, the pressure rating of the relief valve must not exceed 150 psi, the maximum working pressure of the water heater 1000 as marked on the rating plate. In several embodiments, the BTUH rating of the relief valve must equal or exceed the BTUH input of the water heater as marked on its rating plate. In several embodiments, no valve of any type should be installed between the relief valve and the water heater 1000. In several embodiments of the present invention, discharge from the relief valve should be piped to a suitable drain to eliminate potential water damage. Piping used should be of a type approved for the distribution of hot water.

In several embodiments of the present invention, the discharge line must be no smaller than the outlet of the valve and must pitch downward to allow complete drainage (by gravity) of the relief valve and discharge line. In several embodiments, the end of the discharge line should not be threaded or concealed and should be protected from freezing. In several embodiments, no valve of any type, restriction or reducer coupling should be installed in discharge line.

In several embodiments, the electric power supply requirement for this water heater 1000 is 120 VAC/60 Hz, 2 Amps. In several embodiments, there is a three (3) pin power supply cord.

In several embodiments, insulation blankets, available to the general public for external use on gas water heaters, are not necessary. The purpose of an insulation blanket is to reduce the standby heat loss encountered with storage tank heaters. The present inventive water heater 1000 does not store water, making an insulation blanket unnecessary. In several embodiments, a user should use pressure resistant pipe to connect the inlet and outlet water pipes of the water heater 1000 and the local water pump before connecting the inlet water pump, then flush the inside of the pipe.

In several embodiments, mounting of water heater 1000 can follow these steps: In case of dry wall or concrete wall, use dry wall anchors or lag bolts. In several embodiments, the water heater requires 120 VAC/60 Hz.

In several embodiments, the present invention is an improved water heater 100 comprising; a rear housing 200 and a casing 170 with an interior; a Wi-Fi control board 7 located in the interior of said casing 170; an On and Off control board 172 located in the interior of said casing 170; a front control product control board 6 located in the interior of said casing 170; an inner holding tank 31 with a hot water outlet 350 and a cold water intake connector 400 located in the interior of said casing 170; an inlet pipe guider 37; a temperature relief valve connector 300; a flange cover 10 connected to an anode rod 15; said anode rod 15 is in communication with said inner holding tank 31; a temperature limiter and reset button 39 ensconced in a temperature limiter bracket 39. In several embodiments, said Wi-Fi control board 7 is controlled remotely using an electronic application 1001. In several embodiments, said On and Off Control Board 172 and Front Control Product Control Board 6 is controlled remotely using an electronic application 1001. In several embodiments, said anode rod 15 is magnesium. In several embodiments, said temperature limiter and reset button 39 is controlled remotely using an electronic application 1001. In several embodiments, said water heater 100 is electric powered. In several embodiments, the Wi-Fi control board 7 located in the interior of said casing can transmit data on kilowatt usage from said water heater 100. In several embodiments, the anode rod 15 is located at the bottom of said inner holding tank 31.

In several embodiments, the present invention is an improved tankless water heater 1000 comprising; a backing case 1150; a front casing 1100; a top cover 1118 with an air intake vent 1114; a bottom case 1120; an electric supply coil 1105 attached to a regulator or breaker 1110 and a power plug 1112; a burner 1350 in a burner chamber box 1330 with a burner cover plate 1180; a PCB Box 1160; a gas proportional valve 1355; a gas inlet connector 1126; a motor case 1337; a water inlet sensor 1210; a heat exchanger 1265 to intake fluid into the system for the purpose of heating the liquid; a fan assembly bracket 1335; and a display assembly 1200. In several embodiments, said PCB Box 1160 is controlled remotely using an electronic application 1001. In several embodiments, said water inlet sensor 1210 is controlled remotely using an electronic application 1001. In several embodiments, said water inlet sensor 1210 is further comprised of; a water flow sensor 2220; thermostat/temperature sensor wire 2218; and water flow sensor PCB connector 2215. In several embodiments, said gas proportional valve 1355 is further comprised of: lower burner assembly 3315; gas proportional valve chamber 3320; and gas proportional valve lower assembly 3325. In several embodiments, said PCB Box 1160 is further comprised of; a fan blower electronic array 525; a valve electronic array 525; a fan electronic array 521; an outlet and pressure electronic array 516; and a display electronic array 512. In several embodiments, said improved tankless water heater 1000 is gas powered. In several embodiments, the PCB 6 located in the interior of said casing can transmit data on kilowatt usage from said water heater 1000.

While preferred embodiments have been shown and described, modifications thereof can be made by one skilled in the art without departing from the scope or teaching herein. The embodiments described herein are exemplary only and are not limiting. Many variations and modifications of the system and apparatus are possible and will become apparent to those skilled in the art once the above disclosure is fully appreciated. For example, the relative dimensions of various parts, the materials from which the various parts are made, and other parameters can be varied. Accordingly, it is intended that the following claims be interpreted to embrace all such variations and modifications.

What is claimed is the following:

1. An improved tankless smart home water heater comprising:
    a backing case;
    a front casing;
    a top cover with an exhaust and an air intake vent;
    a bottom case attached to a hot water outlet and a water inlet pipe;
    an electric supply coil attached to a power plug and either a regulator or a breaker;
    a burner in a burner chamber box with a burner cover plate;
    a PCB Box;
    a PCB further comprising a Wi-Fi radio and a Wi-Fi radio controller;
        said PCB is in electronic or mechanical communication with at least a thermometer, a clock, and a water flow sensor;
        said PCB is controlled remotely using an electronic application which allows a user to use voice command capability to control one or more of the following aspects of the improved tankless smart home water heater for use with a remote server or cloud service: water temperature, usage timers, water input flow; and/or incoming/outgoing water temperatures; wherein said PCB Box covers said PCB;
    a gas proportional valve comprising a lower and a middle gas proportional valve chamber and a lower burner assembly;
    a gas inlet connector;
    a motor case;
    a water inlet comprising a sensor wherein said sensor is the water flow sensor attached to said PCB via a connector;
    a hot water outlet pipe;
        wherein said water inlet and said hot water outlet pipe are attached and in fluid communication with said bottom case;
    a heat exchanger to intake fluid into the system for the purpose of heating the liquid;
    a fan assembly bracket;
    a display assembly;
        wherein said voice command can perform temperature adjustments in said heat exchanger by sending and receiving a signal comprising an input from the PCB;
        wherein said input comprises one or more of an indication of water flow into the water heater measured via the water flow sensor, or an indication of temperature measured via at least one of the temperature sensors; said signal is transmitted via the PCB to a user via a remote server or a cloud service; and
        wherein said PCB provides a notification to said electronic application, wherein said notification provides information to the user to service said improved tankless smart home water heater, wherein said notification is provided based on the usage timer measuring a pre-determined amount of time and the water input flow measuring a predetermined amount of water flow.

2. The improved tankless smart home water heater of claim 1 further comprising:
    said water inlet sensor that is read remotely using an electronic application; said application can send a command to control water temperature, set usage timers, schedule usage times, or display water input flow.

3. The improved tankless smart home water heater of claim 1 further comprising:
    said water inlet sensor that is further comprised of:
    a water flow sensor;
    a thermostat/temperature sensor wire;
    a water inlet connector with a pressure relief plug; and
    a water flow sensor PCB connector.

4. The improved tankless smart home water heater of claim 1 further comprising:
    said PCB Box further comprising:
    a fan blower electronic array;
    a valve electronic array;
    an outlet and pressure electronic array; and
    a display electronic array.

5. The improved tankless smart home water heater of claim 1 further comprising:
    said improved tankless water heater that is gas powered.

6. The improved tankless smart home water heater of claim 1 further comprising:
    said PCB located in the interior of said casing that can transmit data on kilowatt usage from said water heater.

* * * * *